United States Patent
Baek et al.

(10) Patent No.: US 9,961,515 B2
(45) Date of Patent: May 1, 2018

(54) COMMUNICATION METHOD IN TERMINAL AND TERMINAL SUITABLE FOR THE SAME

(71) Applicant: SAMSUNG ELECTRONICS CO., LTD., Suwon-si (KR)

(72) Inventors: Yun-sun Baek, Suwon-si (KR); Hyeon-mok Ko, Hwaseong-si (KR); Sung-jin Park, Yongin-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days. days.

(21) Appl. No.: 15/193,645

(22) Filed: Jun. 27, 2016

(65) Prior Publication Data

US 2016/0381524 A1 Dec. 29, 2016

Related U.S. Application Data

(60) Provisional application No. 62/185,294, filed on Jun. 26, 2015.

(30) Foreign Application Priority Data

Sep. 9, 2015 (KR) ........................ 10-2015-0127711

(51) Int. Cl.
*H04W 4/08* (2009.01)
*H04L 29/06* (2006.01)
(Continued)

(52) U.S. Cl.
CPC ........... *H04W 4/08* (2013.01); *H04L 65/4046* (2013.01); *H04W 4/005* (2013.01); *H04W 4/10* (2013.01)

(58) Field of Classification Search
CPC .... H04W 4/0005; H04W 4/08; H04L 65/4046
(Continued)

(56) References Cited

U.S. PATENT DOCUMENTS 7,747,268 B2 6/2010 Lim
7,814,205 B2 10/2010 Logalbo et al.
(Continued)

FOREIGN PATENT DOCUMENTS

WO 2007013730 A1 2/2007
WO 2008/154199 12/2008
(Continued)

OTHER PUBLICATIONS

International Search Report and Written Opinion dated Oct. 5, 2016, issued by the International Searching Authority in counterpart International Application No. PCT/KR2016/006823 (PCT/ISA/220, 210 & 237).
(Continued)

*Primary Examiner* — Raymond Dean
(74) *Attorney, Agent, or Firm* — Sughrue Mion, PLLC

(57) ABSTRACT

The present disclosure relates to technologies for a sensor network, machine-to-machine (M2M) communications, or machine type communications (MTC), and Internet of things (IoT), and may be utilized in intelligent services, based on the above technologies, such as a smart home, a smart building, smart cities, smart cars or connected cars, smart grids, healthcare, smart electronics, advanced medical services, public safety network communications through fusion and convergence with conventional IT technologies and various industries. Data transmission control between a group of uncoordinated electronic devices in a computer network including the use of transmission authorization request messages and transmission authorization grant messages.

12 Claims, 17 Drawing Sheets

(51) Int. Cl.
*H04W 4/10* (2009.01)
*H04W 4/00* (2018.01)

(58) Field of Classification Search
USPC .................................................. 455/518, 519
See application file for complete search history.

(56) References Cited

U.S. PATENT DOCUMENTS

| | | |
|---|---|---|
| 2005/0260988 A1 | 11/2005 | Kauppinen |
| 2006/0111135 A1 | 5/2006 | Gray et al. |
| 2014/0293839 A1 | 10/2014 | Brewer et al. |

FOREIGN PATENT DOCUMENTS

| | | |
|---|---|---|
| WO | 2009/058506 | 5/2009 |
| WO | 2014/077743 | 5/2014 |

OTHER PUBLICATIONS

Communication dated Mar. 21, 2018, by the European Patent Office in copending Application No. 16 81 4766.

Garcia-Luna-Aceves et al., "Floor Control Alternatives for Distributed Videoconferencing over IP Networks", IEEE, 1-4244-0030-9/05, 2005.

Singireddy, Suryaprakash, "Distributed Floor Control Protocols for Supporting Priorities in Collaborative Applications", Oklahoma State University, Jul. 2006.

COMMUNICATION METHOD IN TERMINAL AND TERMINAL SUITABLE FOR THE SAME

CROSS-REFERENCE TO RELATED APPLICATIONS

This application claims the benefit of U.S. Provisional Application No. 62/185,294, filed on Jun. 26, 2015, in the U.S. Patent Office and Korean Patent Application No. 10-2015-0127711, filed on Sep. 9, 2015, in the Korean Intellectual Property Office, the disclosures of which are incorporated herein in their entireties by reference.

BACKGROUND

1. Field

The present disclosure relates to a communication method in a terminal, a terminal performing the communication method, and a non-transitory computer-readable storage medium having stored therein program instructions for implementing the method.

2. Description of the Related Art

Internet is evolving from a human-oriented network that human generates and consumes information to an Internet of things (IoT) network in which distributed entities such as things exchange and process information. Furthermore, on the rise is a new technical concept of Internet of Everything (IoE) that the IoT technology is combined with a technology of processing big data in a cloud server or the like. The implementation of the IoT requires sensing technologies, wireless or wired communications and network infrastructure, service interface technologies, and security technologies. In this regard, a sensor network, machine-to-machine (M2M) communications, or machine type communications (MTC) for networking things is being researched recently.

The IoT environment will bring an intelligent Internet Technology (IT) services in which data generated by connected things is collected and analyzed to create a new value to human life. The IoT may be applied to a variety of areas such as a smart home or home automation, a smart building or building automation, smart cities, smart cars or connected cars, smart grids, healthcare, smart electronics, advanced medical services, public safety network communications through fusion and convergence with conventional IT technologies and various industries.

SUMMARY

Provided is a communication method that may be performed in a distributed manner without any terminal performing a role of a server among a plurality of terminals communicating with one another.

According to an aspect of an embodiment, a communication method in a terminal includes: a first terminal's sending a floor request message to each of other terminals in a group in which the first terminal is included; receiving a floor grant message from at least of the other terminals in the group after expiration of stand-by times determined randomly for each of the other terminals; and sending media data to each of the other terminals in the group.

The communication method may further include: receiving a floor request message of another terminal in the group in a preset time interval after the floor request message is sent. In such an embodiment, the floor grant message may be received if a priority of the first terminal is higher than a priority of the other terminal.

The communication method may further include: receiving a floor request message of another terminal in the group in a preset time interval after the floor request message is sent. In such an embodiment, the floor grant message may be received if a random number generated in the first terminal is greater than a random number generated in the other terminal.

The communication method may further include: receiving a floor request message of another terminal in the group while sending the media data; sending a floor denial message to the other terminal; and sending a floor release message to each of the other terminals after the sending of the media data is completed.

The communication method may further include: receiving a floor request message of another terminal in the group while sending the media data; stopping the sending of the media data if a priority of the other terminal is higher than a priority of the first terminal; sending a floor grant message to the other terminal; and receiving media data of the other terminal.

According to an aspect of another embodiment, a communication method in a terminal includes: receiving a floor request message from a first terminal among other terminals in a group in which the terminal is included; sending a floor grant message for the first terminal to each of the other terminals in the group based on whether the floor grant message is received from one of the other terminal in the group or not; and receiving media data from the first terminal.

The communication method may further include: monitoring whether a floor request message of another terminal is received in a preset time interval from an instant of receiving the floor request message of the first terminal or not; and determining the first terminal as a terminal having the floor if the floor request message of the other terminal is not received in the preset time interval.

The floor grant message may be sent when the floor grant message for the first terminal is not received from any of the other terminals in the group.

The communication method may further include: receiving a floor request message from a second terminal among the other terminals in the group; and comparing a priority of the first terminal with a priority of the second terminal and determining a terminal having a floor based on a comparison result. In such an embodiment, the floor grant message may be sent to the first terminal having the priority higher than the second terminal.

The communication method may further include: receiving a floor request message from a second terminal among the other terminals in the group; and comparing a random number generated in the first terminal with a random number generated in the second terminal and determining a terminal having a floor based on a comparison result. In such an embodiment, the floor grant message may be sent to the first terminal having the random number greater than the second terminal.

According to an aspect of another embodiment, a communication method in a terminal includes: sending a floor request message, performed by a first terminal, to each of other terminals in a group in which the first terminal is included; sending media data to each of the other terminals in the group; and stopping the sending of the media data if a floor grant message is not received from at least one of the other terminals in the group during a preset time interval.

According to an aspect of an embodiment, a first terminal includes: a communicator configured to send a floor request message to each of other terminals in a group in which the first terminal is included; a controller configured to determine whether a floor grant message is received from at least one of the other terminals in the group. The communicator may receive the floor grant message from at least of the other terminals in the group after expiration of stand-by times determined randomly for each of the other terminals, and send media data to each of the other terminals in the group.

The communicator may receive a floor request message of another terminal in the group in a preset time interval after the floor request message is sent. In such an embodiment, the floor grant message may be received when a priority of the first terminal is higher than a priority of the other terminal.

The communicator may receive a floor request message of another terminal in the group in a preset time interval after the floor request message is sent. In such an embodiment, the floor grant message may be received when a random number generated in the first terminal is greater than a random number generated in the other terminal.

The communicator may receive a floor request message of another terminal in the group while sending the media data, and send a floor release message to each of the other terminals after the sending of the media data is completed.

The controller may stop sending of the media data if a floor request message of another terminal in the group is received while sending the media data and a priority of the other terminal is higher than a priority of the first terminal. In such an embodiment, the communicator may send a floor grant message to the other terminal and receive media data of the other terminal.

According to an aspect of another embodiment, a terminal includes: a communicator configured to receive a floor request message from a first terminal among other terminals in a group in which the terminal is included; and a controller configured to determine whether a floor grant message is received from at least one of the other terminals in the group. The communicator may send a floor grant message for the first terminal to each of the other terminals in the group based on a determination result of the controller and receive media data from the first terminal.

The controller may monitor whether a floor request message of another terminal is received in a preset time interval from an instant of receiving the floor request message of the first terminal or not, and determine the first terminal as a terminal having the floor if the floor request message of the other terminal is not received in the preset time interval.

The communicator may send the floor grant message when the floor grant message for the first terminal is not received from any of the other terminals in the group.

The controller may compare a priority of the first terminal with a priority of a second terminal when a floor request message is received from the second terminal among the other terminals in the group, and determine a terminal having a floor based on a comparison result. In such an embodiment, the communicator may send the floor grant message to the first terminal having the priority higher than the second terminal.

The controller may compare a random number generated in the first terminal with a random number generated in a second terminal when a floor request message is received from the second terminal among the other terminals in the group, and determine a terminal having a floor based on a comparison result. In such an embodiment, the communicator may send the floor grant message to the first terminal having the random number greater than the second terminal.

According to another aspect of an embodiment, a first terminal includes: a communicator configured to send a floor request message to each of other terminals in a group in which the first terminal is included and send media data to each of the other terminals in the group; and a controller configured to stop sending of the media data if a floor grant message is not received from at least one of the other terminals in the group during a preset time interval.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
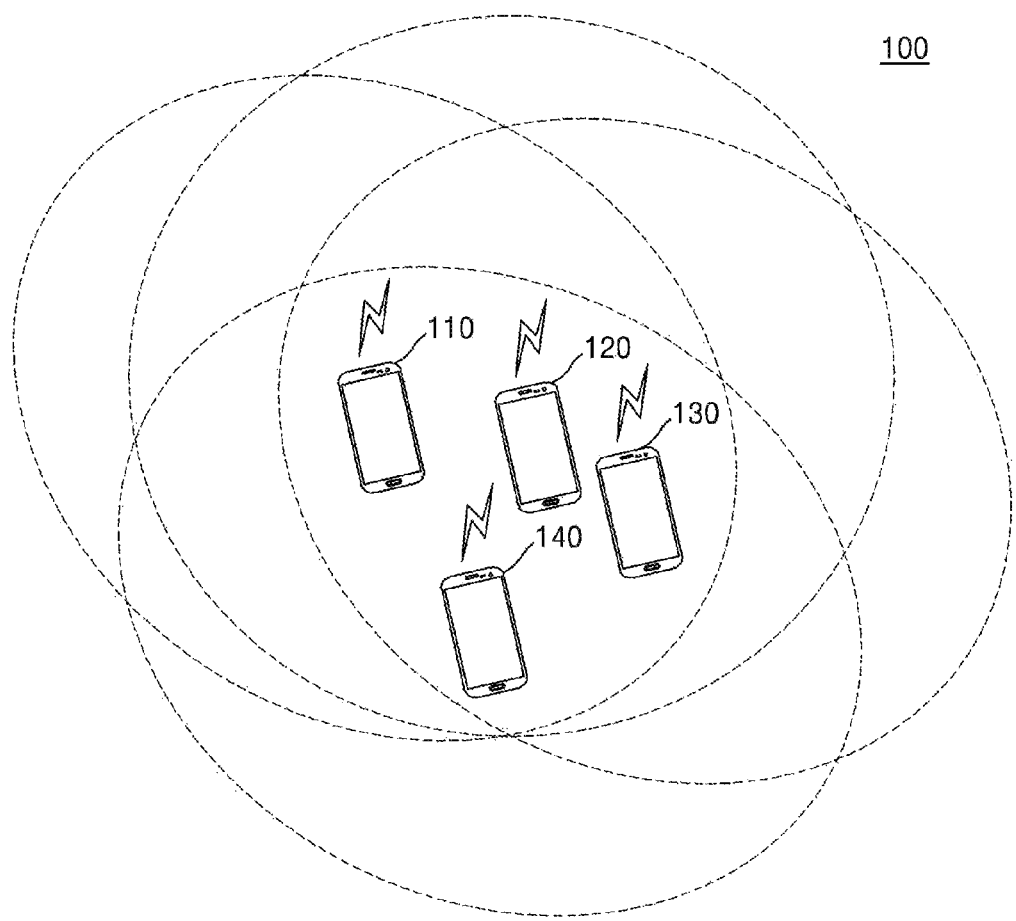
FIG. 1 illustrates a communications system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

Before discussing the present disclosure, the terms used herein will be described first briefly.

Although general terms widely used at present were selected for describing the embodiments in consideration of the functions thereof, these general terms may vary according to intentions of one of ordinary skill in the art, case precedents, the advent of new technologies, and the like. Terms arbitrarily selected by the applicant may also be used in a specific case. In this case, their meanings need to be given in the detailed description of the present disclosure. Hence, the terms must be defined based on their meanings and the contents of the entire specification, not by simply stating the terms.

As used herein, the term "and/or" includes any and all combinations of one or more of the associated listed items. Expressions such as "at least one of," when preceding a list of elements, modify the entire list of elements and do not modify the individual elements of the list.

The expressions "~ comprises," "~ includes," "~ constructed," "~ configured" are not to be construed as being equipped with all the components, processing steps, or operations described in this specification, but some of the components, the processing steps, or the operations may not be included and additional elements may be incorporated further. Terminologies such as "~ unit" and "~ module" refer to entities performing at least one function or operation, and may be implemented by hardware, software, or combination thereof.

FIG. 1 illustrates a communications system 100 according to an embodiment.

The communications system 100 according to the illustrated embodiment may include a plurality of terminals 110-140.

In FIG. 1, only the components related with the present embodiment are depicted for a purpose of simplified illustration. Those having ordinary skill in the art would appreciate that additional general purpose components may be further included in the communications system 100 of FIG. 1. For example, the communications system 100 may include other terminals in addition to the plurality of terminals 110-140.

A session for transmitting or receiving data may be set up among the plurality of terminals 110-140 in the communications system 100. The plurality of terminals 110-140 may be included in a group among one or more groups previously set in the communications system 100.

Referring to FIG. 1, each of the terminals 110-140 in a group may directly transmit or receive data to and from one another as long as the receiving terminal is within a communicable range from the transmitting terminal. For example, each of the terminals 110-140 requests a floor, or a transmission authorization, when the terminal needs to send media data, and starts sending of the media data when the floor request is granted. In this specification including the appended claims, the term "floor" refers to a temporary authorization to access transmission medium and/or other shared resources. Each of the terminals 110-140 in a group may transmit or receive, by multicasting, media data and control data such as a floor request message, a floor grant message, a floor release message, and a floor request acceptance message. Here, the multicasting is no more than an example, and the communication method between the terminals 110-140 in the group is not limited thereto.

The communications system 100 according to an embodiment may process a a floor request of at least one terminal in the group even when there is no server designated previously. For example, at least one terminal that is to send media data may request the floor to the other terminals in the group, and obtain the floor by receiving a response to the request.

Also, the communications system 100 according to an embodiment may determine a terminal having the floor even when there is no server designated previously and a race condition happens due to floor requests from a plurality of terminals. For example, if two or more terminals request the floors, the terminal having the floor may be determined based on prescribed priorities or random values generated for each of the terminals in the group.

According to another embodiment, the communications system 100 may process the floor request sent by a terminal when another terminal is sending the media data. For example, if it is assumed that, while one of the terminals 110-140 is sending the media data, another terminal sends the floor request message, the floor is given to the other terminal after the sending of the media data is completed. For another example, the terminal sending the media data may determine a terminal that is to have the floor by comparing priorities or random values of the terminals that have sent the floor request messages.

In case that there is no terminal having the floor in the communications system 100 according to an embodiment, the terminals in the group may recognize the absence of the terminal having the floor and quickly give the floor to one of the terminals. Here, the case that there is no terminal having the floor may include when, for example, a battery of the terminal having the floor is discharged or the terminal goes out of a direct communications coverage of the group, but the case is not limited thereto.

Figure 2:
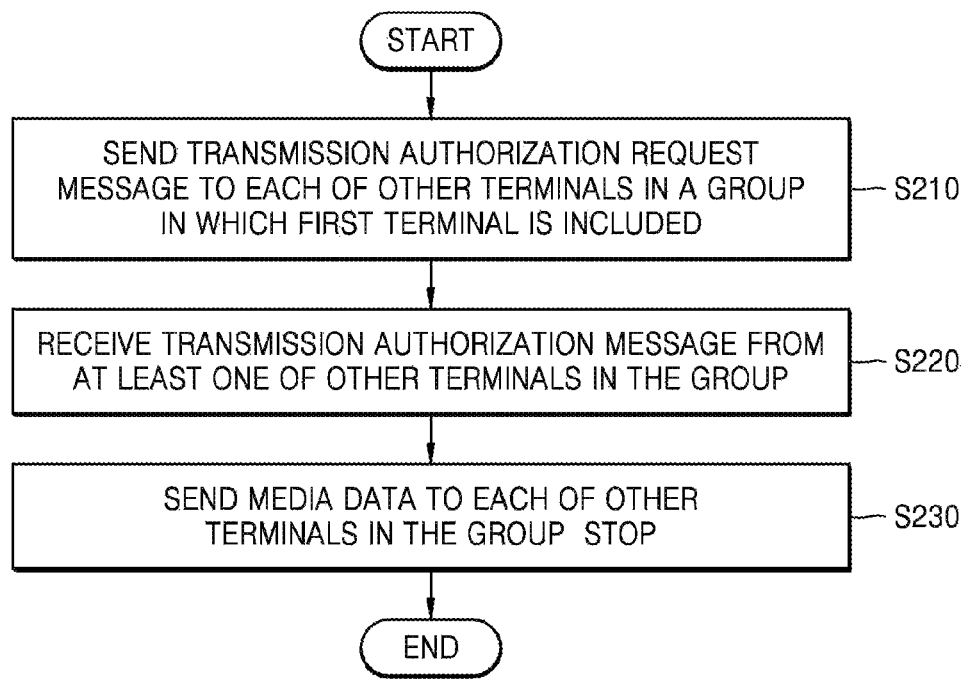
FIG. 2 is a flowchart illustrating a method of obtaining a floor performed by a first terminal among a plurality of terminals in a group according to an embodiment.

FIG. 2 illustrates a method of obtaining a floor performed by the first terminal 110 among the terminals 110-140 in the group according to an embodiment.

In operation S210, the first terminal 110 sends a floor request message to each of the other terminals 120-140 in the group in which the first terminal 110 is included.

According to an embodiment, each of the terminals 110-140 in the group may request the floor to send media data to the other terminals. For example, the first terminal 110 may send the floor request message to each of the other terminals 120-140 in the group to send media data of the first terminal 110.

The first terminal 110 may monitor a presence of another terminal that requested the floor for a certain time interval before sending the floor request message. The first terminal 110 may send the floor request message to each of the other terminals 120-140 in the group when it determines that the floor request message has not been received from any of the other terminals after the monitoring of the presence of the other terminal for the certain time interval.

In operation S220, the first terminal 110 may receive a floor grant message from at least one of the other terminals in the group after expiration of stand-by times that may be determined randomly and separately for each of the other terminals 120-140 in the group.

According to an embodiment, the first terminal 110 may receive the floor grant message from at least one of the other terminals in the group when there is no terminal that has requested the floor among the other terminals 120-140 in the group.

According to another embodiment, if there is another terminal that has requested the floor besides the first terminal 110, the first terminal 110 may receive the floor grant message according to a prescribed rule for the race condition. For example, if the floor request message has been sent by another terminal within the certain time interval before or after the first terminal 110 sent the floor request message, the first terminal 110 may not receive the floor grant message from the other terminal during the monitoring interval and there may occur the race condition between the first terminal 110 and the other terminal. The process carried out under the race condition will be described in detail below with reference to FIG. 5.

On the other hand, the other terminals in the group, e.g. a third terminal 130, that receive the floor request message from the first terminal 110 may monitor a receipt of another the floor request message for the certain time interval from the receipt of the floor request message of the first terminal 110. Here, the certain time interval may be one round trip time (RTT), for example. If no other floor request message is received from another terminal, the floor grant message may be sent to the first terminal 110.

Each of the other terminals 120-140 in the group may send the floor grant message after the expiration of the stand-by time that is previously determined independently from the other terminals, in case that no other floor request message is received for the stand-by time. Meanwhile, in case that another floor grant message containing the same information is received from another terminal (e.g. the third terminal 130), a terminal (e.g. the second terminal 120) may not send the floor grant message in order to prevent waste of network resources. That is, if the floor grant message is sent by the third terminal 130 of which stand-by time expires first, the second terminal 120 may not send the floor grant message.

The third terminal 130, for example, of which stand-by time expires first among the second through fourth terminals 120-140 may send the floor grant message that authorizes a transmission of the first terminal 110 to each of the first terminal 110, the second terminal 120, and the fourth terminal 140 as no floor grant message is received from the other terminals 120 and 140.

In operation S230, the first terminal 110 sends the media data to each of the other terminals 120-140 in the group.

According to an embodiment, the first terminal 110 may send the media data to each of the other terminals 120-140 in the group as it receives the floor grant message from a terminal of which stand-by time expires first among the other terminals 120-140 in the group.

Figure 3:
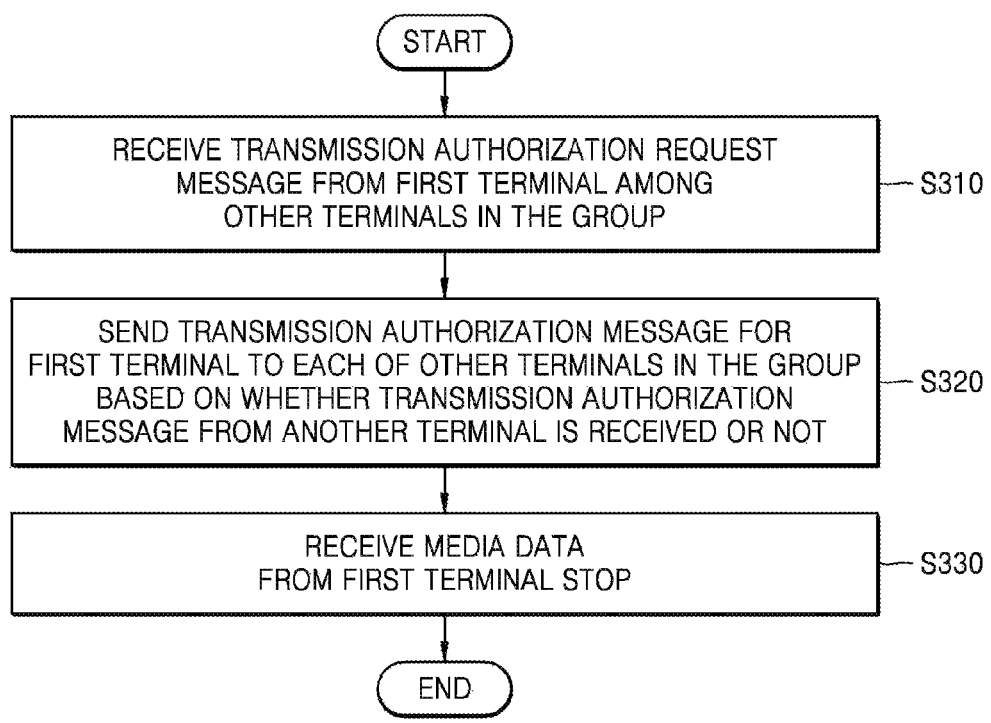
FIG. 3 is a flowchart illustrating a method of determining a terminal to have a floor performed by one terminal among the terminals in the group.

FIG. 3 illustrates a method of determining a terminal having a floor by one terminal among the terminals 110-140 in the group.

In operation S310, a terminal (e.g. the second terminal 120) receives the floor request message from the first terminal 110 among the other terminals in the group in which the terminal (e.g. the terminal 120) is included.

In operation S320, the terminal (e.g. the second terminal 120) sends the floor grant message for the first terminal to each of the other terminals in the group based on whether the floor grant message is received from another terminal in the group or not.

According to an embodiment, the terminal (e.g. the second terminal 120) may monitor a receipt of the floor request message from another terminal (e.g. the third terminal 130) for a certain time interval from the receipt of the floor request message of the first terminal 110. For example, the terminal (e.g. the second terminal 120) may monitor the receipt of the floor request message from the third terminal 130 for one RTT from the instant that the floor request message of the first terminal 110 is received.

If the floor request message from another terminal (e.g. the third terminal 130) is not received during the certain time interval from the receipt of the floor request message of the first terminal 110, the terminal (e.g. the second terminal 120) may determine the first terminal 110 as a terminal having the floor.

Meanwhile, according to another embodiment, if the floor request message from another terminal (e.g. the third terminal 130) is received during the certain time interval from the receipt of the floor request message of the first terminal 110, the terminal (e.g. the second terminal 120) may determine the terminal having the floor, according to a prescribed rule for the race condition, based on the prescribed priorities or random values of the terminals having sent the floor request message. The process carried out under the race condition will be described in detail below with reference to FIG. 5.

According to an embodiment, the terminal (e.g. the second terminal 120) may generate randomly a value of the stand-by time for sending the floor grant message. The terminal (e.g. the second terminal 120) may send the floor grant message to the other terminals 110, 130, and 140 in the group after the expiration of the stand-by time that starts after a certain time from the receipt of the floor request message of the first terminal 110.

Meanwhile, if the floor grant message for the first terminal 110 is received from another terminal before the expiration of the stand-by time, the terminal (e.g. the second terminal 120) may not send the floor grant message in order to prevent unnecessary use of the network resources.

However, in case that information to be contained in the floor grant message by the terminal (e.g. the second terminal 120) is different from information contained in the floor grant message received from another terminal, the terminal (e.g. the second terminal 120) may send the floor grant message. For example, if a plurality of terminals (e.g. the first terminal 110 and the third terminal 130) have requested the floor, the terminal determined by the second terminal 120 to have the floor may be different from the terminal determined by the fourth terminal 140 to have the floor. Such a case may happen, for example, when the floor request message sent by some terminal is lost due to a network condition.

In operation S330, the terminal (e.g. the second terminal 120) receives the media data from the first terminal 110. In other words, the terminal (e.g. the second terminal 120) may receive the media data from the first terminal 110 that obtained the floor.

Figure 4:
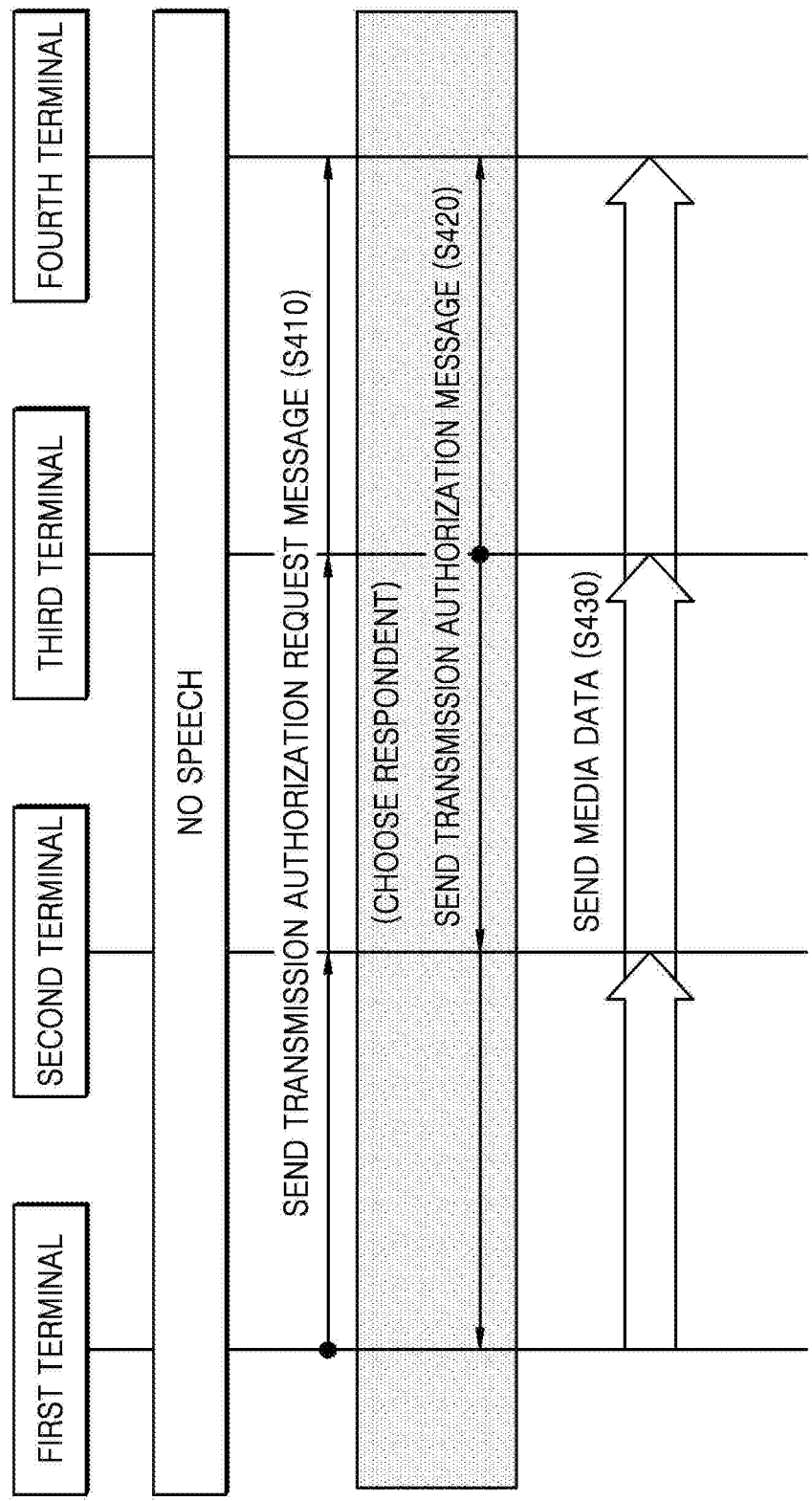
FIG. 4 is a flowchart illustrating a method of obtaining the floor performed by a first terminal when there is no terminal sending media data in the communications system according to an embodiment.

FIG. 4 illustrates a method of obtaining the floor performed by the first terminal 110 when there is no terminal sending media data in the communications system 100 according to an embodiment.

In operation S410, the first terminal 110 may send the floor request to each of the other terminals 120-140 in the group if data is not received from the other terminals for a prescribed time.

In operation S420, the third terminal 130 may send the floor grant message for the first terminal 110 to the second terminal 120 and the fourth terminal 140.

According to an embodiment, each of the second through fourth terminals 120-140 that received the floor request message from the first terminal 110 may determine the terminal having the floor. It is assumed in FIG. 4 that another floor request message is not received by the second through fourth terminals 120-140 for a certain time from the instant that the floor request message from the first terminal 110 is received by each of the second through fourth terminals 120-140.

Each of the second through fourth terminals 120-140 may generate randomly a value of the stand-by time. Each of the second through fourth terminals 120-140 may monitor the receipt of the floor grant message for the first terminal 110 during respective stand-by times.

The third terminal 130 of which stand-by time expires first according to an embodiment may be chosen as a respondent since the floor grant message is not received from the second terminal 120 or the fourth terminal 140 during the stand-by time. The third terminal 130 may send the floor grant message for the first terminal 110 to the first terminal 110, the second terminal 120, and the fourth terminal 140.

In operation S430, the first terminal 110 may send media data to each of the second terminal 120, the third terminal 130, and the fourth terminal 140 after receiving the floor grant message from the third terminal 130.

Figure 5:
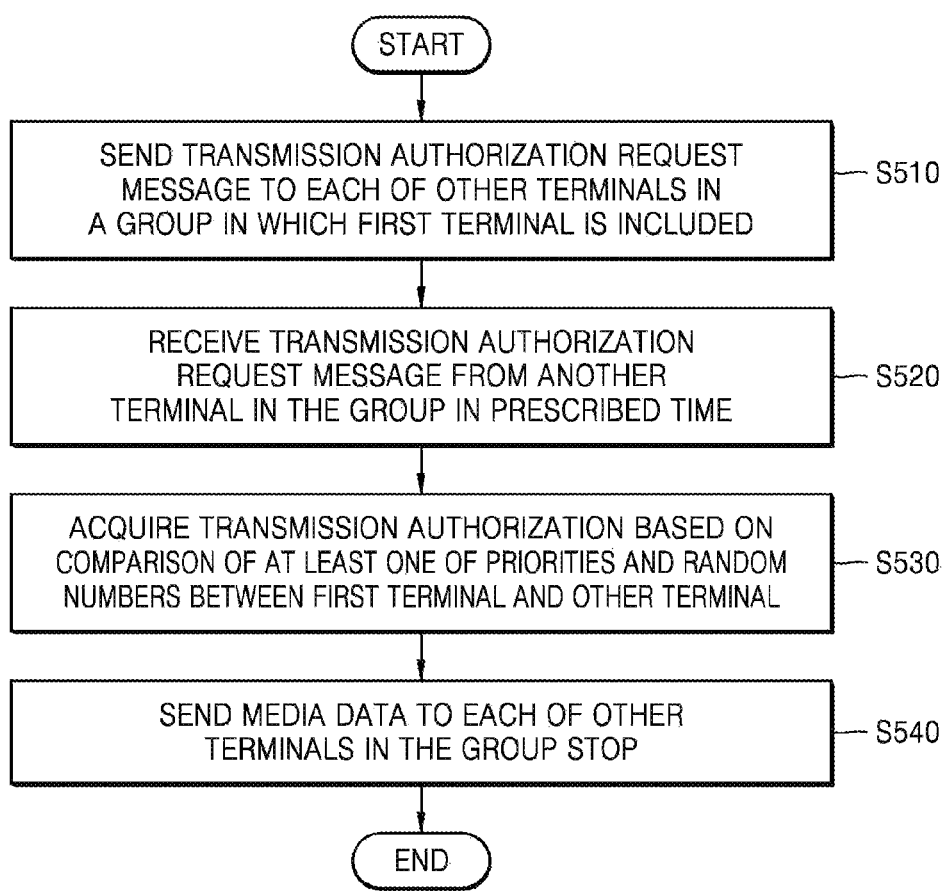
FIG. 5 is a flowchart illustrating a process that a first terminal is determined to be a terminal having the floor when a race for the floor happened in the communications system according to an embodiment.

FIG. 5 illustrates a process that the first terminal 110 is determined to be a terminal having the floor when a race for the floor happened in the communications system 100 according to an embodiment.

In operation S510, the first terminal 110 may send the floor request message to each of the other terminals 120-140 in the group in which the first terminal 110 is included. The operation S510 may correspond to the operation S210 discussed above with reference to FIG. 2.

In operation S520, the first terminal 110 may receive the floor request message from another terminal (e.g. the fourth terminal 140) in the group during a prescribed time after sending the floor request message. For example, the first terminal 110 may receive the floor request message from the fourth terminal 140 in one RTT after sending the floor request message.

In operation S530, the first terminal 110 may obtain the floor according to a comparison of at least one of the priorities and random values between the first terminal 110 and the other terminal (e.g. the fourth terminal 140).

In case that the floor request message is generated by the plural terminals 110 and 140 in the communications system 100 according to an embodiment, one terminal having the floor is determined based on at least one of respective priorities and random values of the plural terminals 110 and 140.

Here, the priorities of the terminals in the group may be set previously. For example, the first terminal 110 may have a highest priority among the in the group. Accordingly, of the first and fourth terminals 110 and 140 in the above example, the first terminal 110 may be determined to be the terminal having the floor.

As another example, the random values generated for the first terminal 110 and the fourth terminal 140 may be included in the floor request message of the first terminal 110 and the floor request message of the fourth terminal 140, respectively. If the random value for the first terminal 110 is greater than the random value for the fourth terminal 140, the first terminal 110 may be determined to be the terminal having the floor. However, a terminal (i.e. the fourth terminal 140) having a smaller random value may be determined to be the terminal having the floor in another embodiment.

In operation S540, the first terminal 110 may send the media data to each of the other terminals 120-140 in the group. The operation S540 may correspond to the operation S230 discussed above with reference to FIG. 2.

Figure 6:
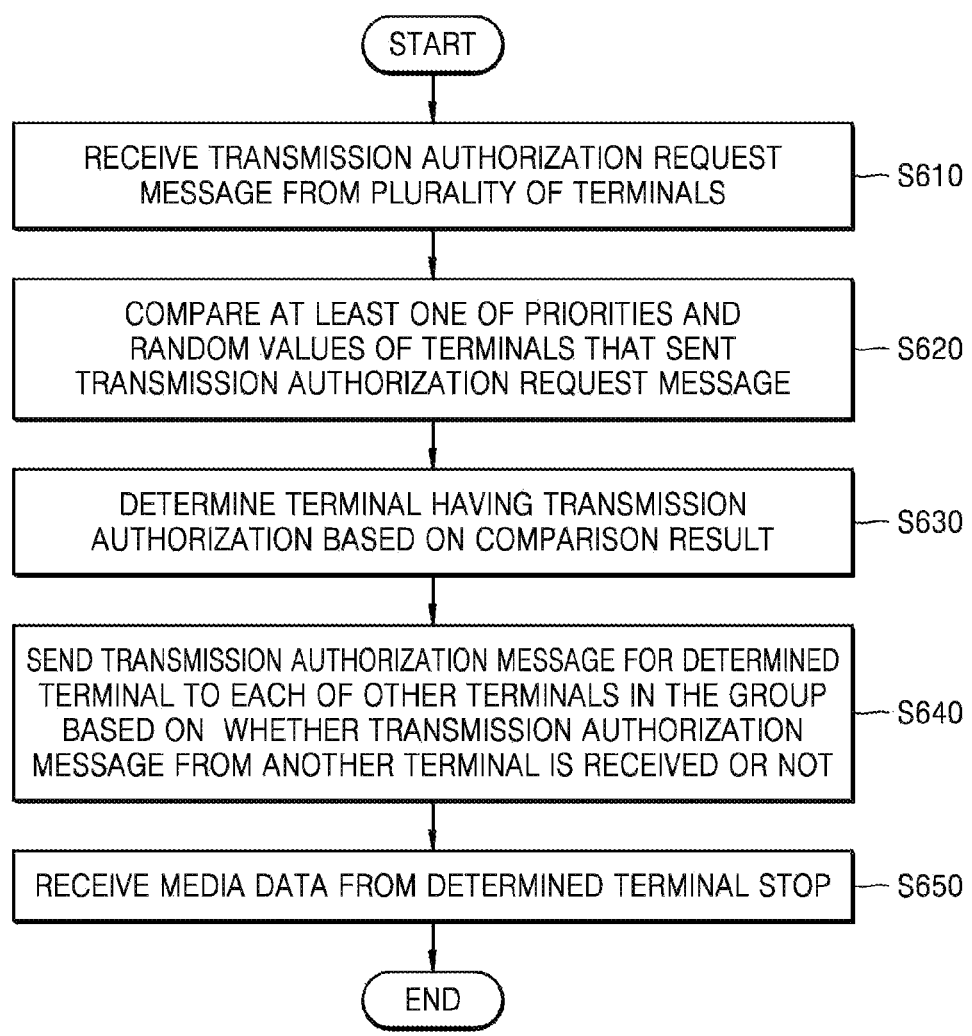
FIG. 6 is a flowchart illustrating a method of determining a terminal to have the floor performed by one terminal when the race for the floor happened in the communications system according to an embodiment.

FIG. 6 illustrates a method of determining a terminal to have the floor performed by on of the terminals (e.g. the second terminal 120) when the race for the floor happened in the communications system 100 according to an embodiment.

In operation S610, a terminal (e.g. the second terminal 120) may receive the floor request messages from each of a plurality of terminals 110 and 140 in the group.

For example, the terminal (e.g. the second terminal 120) may receive the floor request message of the fourth terminal 140 in a certain time from the instant of receiving the floor request message of the first terminal 110. However, the above sequence of receiving the messages is provided for an exemplary purpose, and the floor request message of the fourth terminal 140 may be received first and receiving the floor request message of the first terminal 110 may be received in the certain time from the instant of receiving the floor request message of the fourth terminal 140.

In operation S620, the terminal (e.g. the second terminal 120) may compare at least one of the priorities and the random values of the plurality of terminals 110 and 140 that requested the floor. According to an embodiment, the terminal (e.g. the second terminal 120) may compare the priorities of the first terminal 110 and the fourth terminal 140 that requested the floor. According to another embodiment, the terminal (e.g. the second terminal 120) may compare the random value generated in the first terminal 110 with the random value generated in the fourth terminal 140 when the priorities of the first terminal 110 and the fourth terminal 140 are the same as each other. According to yet another embodiment, the terminal (e.g. the second terminal 120) may compare the random value of the first terminal 110 with the random value of the fourth terminal 140 in case that the priorities are not set previously for the terminals 110-140 in the group.

In operation S630, the terminal (e.g. the second terminal 120) may determine the terminal to have the floor based on a comparison result.

According to an embodiment, the terminal (e.g. the second terminal 120) may determine the terminal having the floor after comparing the priorities of the first terminal 110 and the fourth terminal 140 that requested the floor. The terminal (e.g. the second terminal 120) may determine the first terminal 110 that has a higher priority than the fourth terminal 140 as the terminal having the floor.

According to another embodiment, the terminal (e.g. the second terminal 120) may determine the terminal having the floor after comparing the random value generated in the first terminal 110 with the random value generated in the fourth terminal 140 when the priorities of the first terminal 110 and the fourth terminal 140 are the same as each other. The terminal (e.g. the second terminal 120) may determine the first terminal 110 that has a larger random value than the fourth terminal 140 as the terminal having the floor. However, a terminal having a smaller random value may be determined as the terminal having the floor depending on settings of the system.

According to yet another embodiment, the terminal (e.g. the second terminal 120) may determine the first terminal 110 that has a larger random value than the fourth terminal 140 as the terminal having the floor in case that the priorities are not set previously for the terminals 110-140 in the group. However, a terminal having a smaller random value may be determined as the terminal having the floor depending on settings of the system.

In operation S640, the terminal (e.g. the second terminal 120) may send the floor grant message to each of the other terminals in the group based on whether the floor grant message is received from another terminal in the group or not. The operation S640 may correspond to the operation S320 discussed above with reference to FIG. 3.

In operation S650, the terminal (e.g. the second terminal 120) may receive the media data from the determined terminal. For example, if the first terminal 110 is determined to be the terminal having the floor, the terminal (e.g. the second terminal 120) may receive the media data from the first terminal 110.

Figure 7:
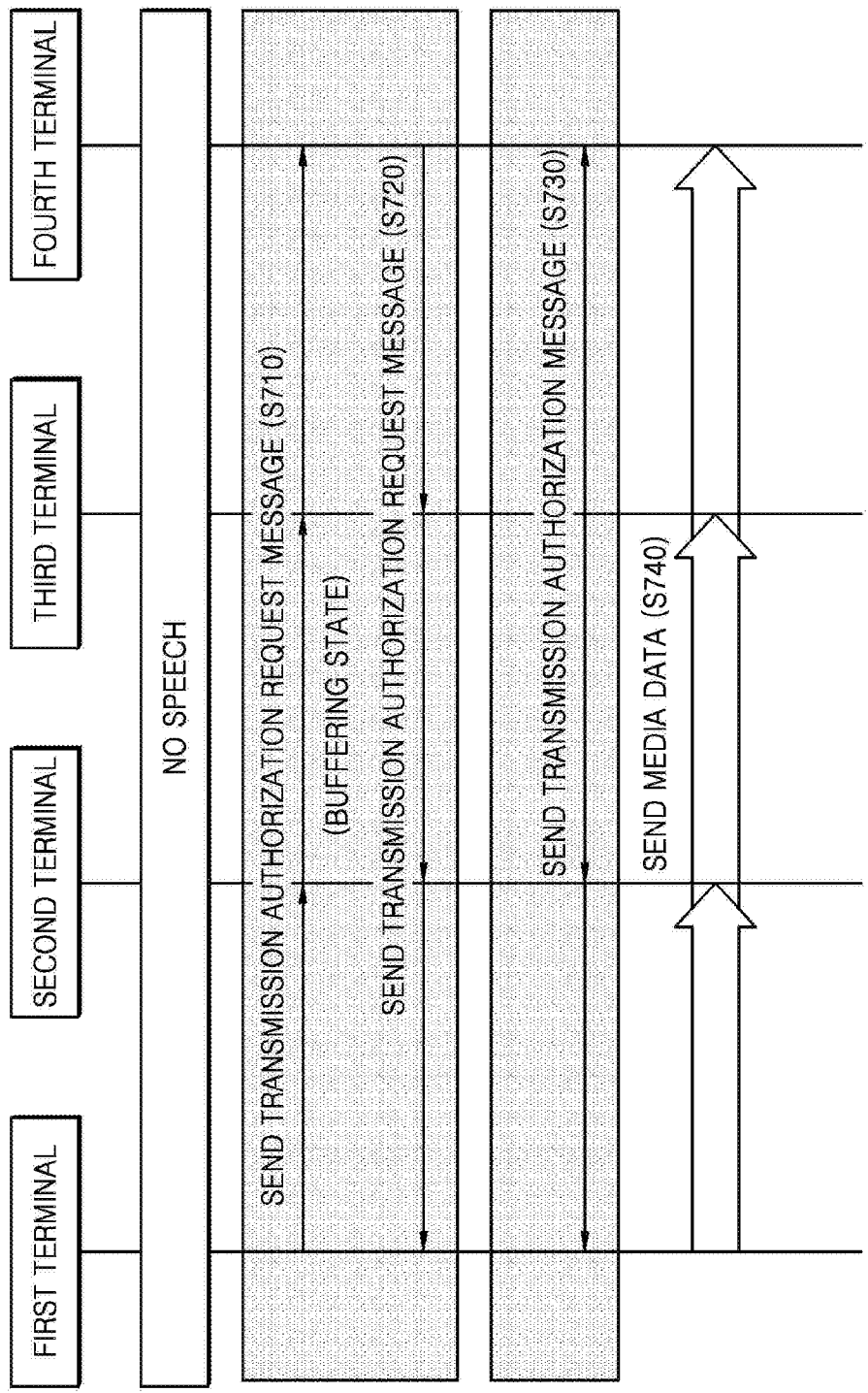
FIG. 7 is a flowchart illustrating a method of determining a terminal having the floor when a race for the floor happened in the communications system according to an embodiment.

FIG. 7 illustrates a method of determining a terminal having the floor when a race for the floor happened in the communications system 100 according to an embodiment.

In operation S710, the first terminal 110 may send the floor request to each of the other terminals 120-140 in the group if data is not received from the other terminals for a prescribed time.

In operation S720, the fourth terminal 140 may send the floor request to each of the other terminals 110-130 in the group if data is not received from the other terminals for a prescribed time.

Meanwhile, the fourth terminal 140 may not receive the floor request message of the first terminal 110 sent in the operation S710 during the prescribed time depending on the distance to the first terminal 110 and the network condition.

In operation S730, the third terminal 130 may send the floor grant message for the first terminal 110 to the first terminal 110, the second terminal 120, and the fourth terminal 140.

According to an embodiment, the second terminal 120 and the third terminal 130 may receive the floor request message of the fourth terminal 140 in the prescribed time from the instant of receiving the floor request message of the first terminal 110. Also, the first terminal 110 may receive the floor request message of the fourth terminal 140 in a certain time from the instant of sending the floor request message.

Each of the terminals 110-140 in the group may determine the terminal having the floor based on at least one of the priorities and random values of the terminals 110 and 140 that requested the floor.

For example, the third terminal 130 may determine the first terminal 110 having a higher priority than the fourth terminal 140 as the terminal having the floor. In another embodiment, in case that the priorities of the first terminal 110 and the fourth terminal 140 are the same as each other, the third terminal 130 may compare random values generated in the first terminal 110 and the fourth terminal 140 and determine the first terminal 110 having a larger random value than the fourth terminal 140 as the terminal having the floor.

In yet another embodiment, in case that the priorities are not set previously for the terminals 110-140 in the group, the third terminal 130 may 130 may compare random values generated in the first terminal 110 and the fourth terminal 140 and determine the first terminal 110 having a larger random value than the fourth terminal 140 as the terminal having the floor.

Also, the first terminal 110, the second terminal 120, and the fourth terminal 140 may determine the terminal having the floor by comparing at least one of the priorities and random values of the terminals 110 and 140 that requested the floor.

On the other hand, a first through fourth terminals 110-140 may generate randomly a value of the stand-by time. Each of the first through fourth terminals 110-140 may monitor the receipt of the floor grant message for the first terminal 110 during respective stand-by times.

The third terminal 130 of which stand-by time expires first according to an embodiment may be chosen as a respondent since the floor grant message is not received from the first terminal 110, the second terminal 120, or the third terminal 140 during the stand-by time. The third terminal 130 may send the floor grant message for the first terminal 110 to the first terminal 110, the second terminal 120, and the fourth terminal 140.

In operation S740, the first terminal 110 may send media data to each of the second terminal 120, the third terminal 130, and the fourth terminal 140 after receiving the floor grant message from the third terminal 130.

Figure 8:
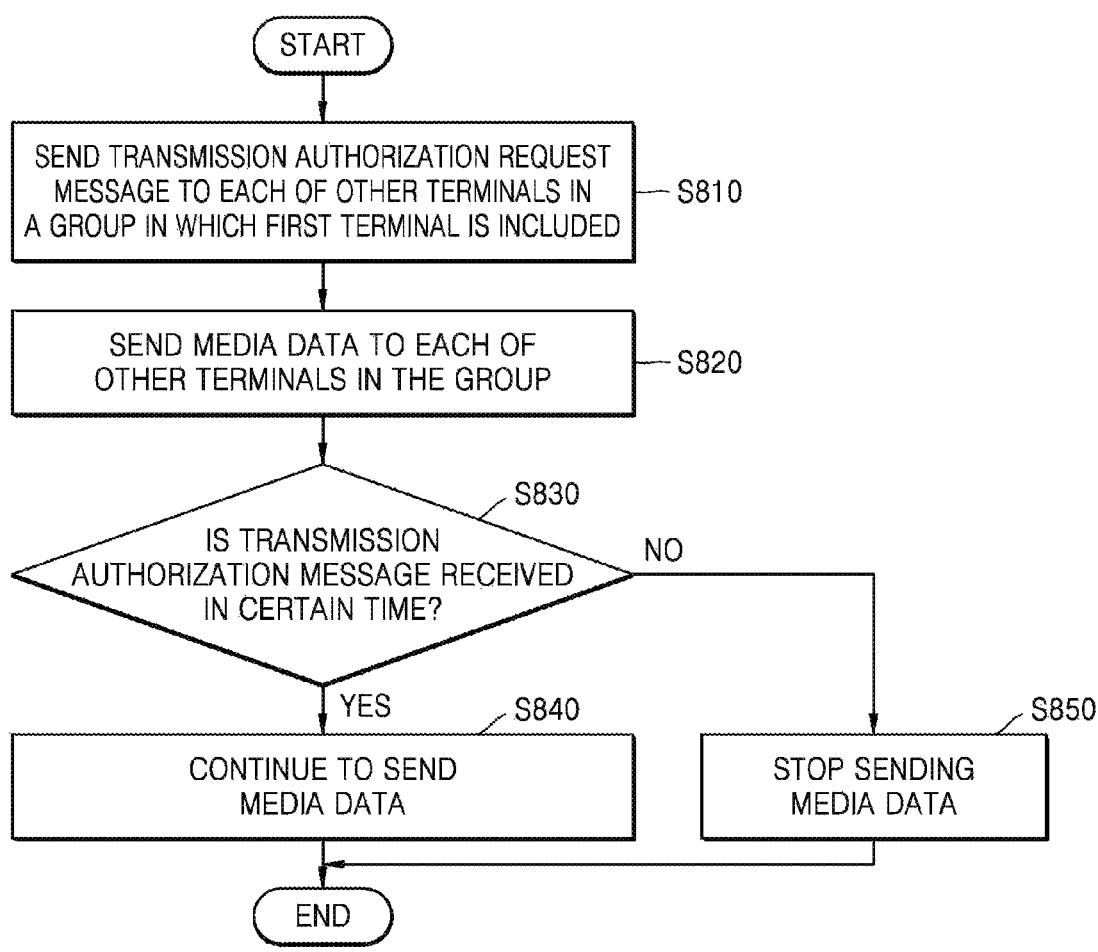
FIG. 8 is a flowchart illustrating a method of obtaining the floor performed by a first terminal among terminals in a group according to another embodiment.

FIG. 8 illustrates a method of obtaining the floor performed by the first terminal 110 among the terminals 110-140 in the group according to another embodiment.

In operation S810, the first terminal 110 sends the floor request message to each of the terminals 120, 130, and 140 in the group in which the first terminal 110 is included.

According to an embodiment, the first terminal 110 may monitor a presence of another terminal that requested the floor for a certain time interval before the first terminal 110 sends the floor request message. The first terminal 110 may send the floor request message to each of the other terminals 120-140 in the group when it determines that the floor request message has not been received from any of the other terminals after the monitoring of the presence of the other terminal for the certain time interval.

In operation S820, the first terminal 110 may send the media data to each of the other terminals 120-140 in the group.

According to an embodiment, the first terminal 110 may send the media data to other terminals 120-140 in the group after sending the floor request message. In other words, the first terminal 110 may send the media data after sending the floor request message without waiting for a receipt of the floor grant message from at least one of the other terminals 120-140 in the group.

In operation S830, the first terminal 110 may determine whether a floor grant message is received from at least one of the other terminals 120-140 in the group in a certain time or not.

In operation S840, the first terminal 110 may continue to send the media data as the floor grant message is received from at least one of the other terminals 120-140 in the group in the certain time.

In operation S850, the first terminal 110 may stop sending the media data in case that the floor grant message is not received from at least one of the other terminals 120-140 in the group in the certain time.

Figure 9:
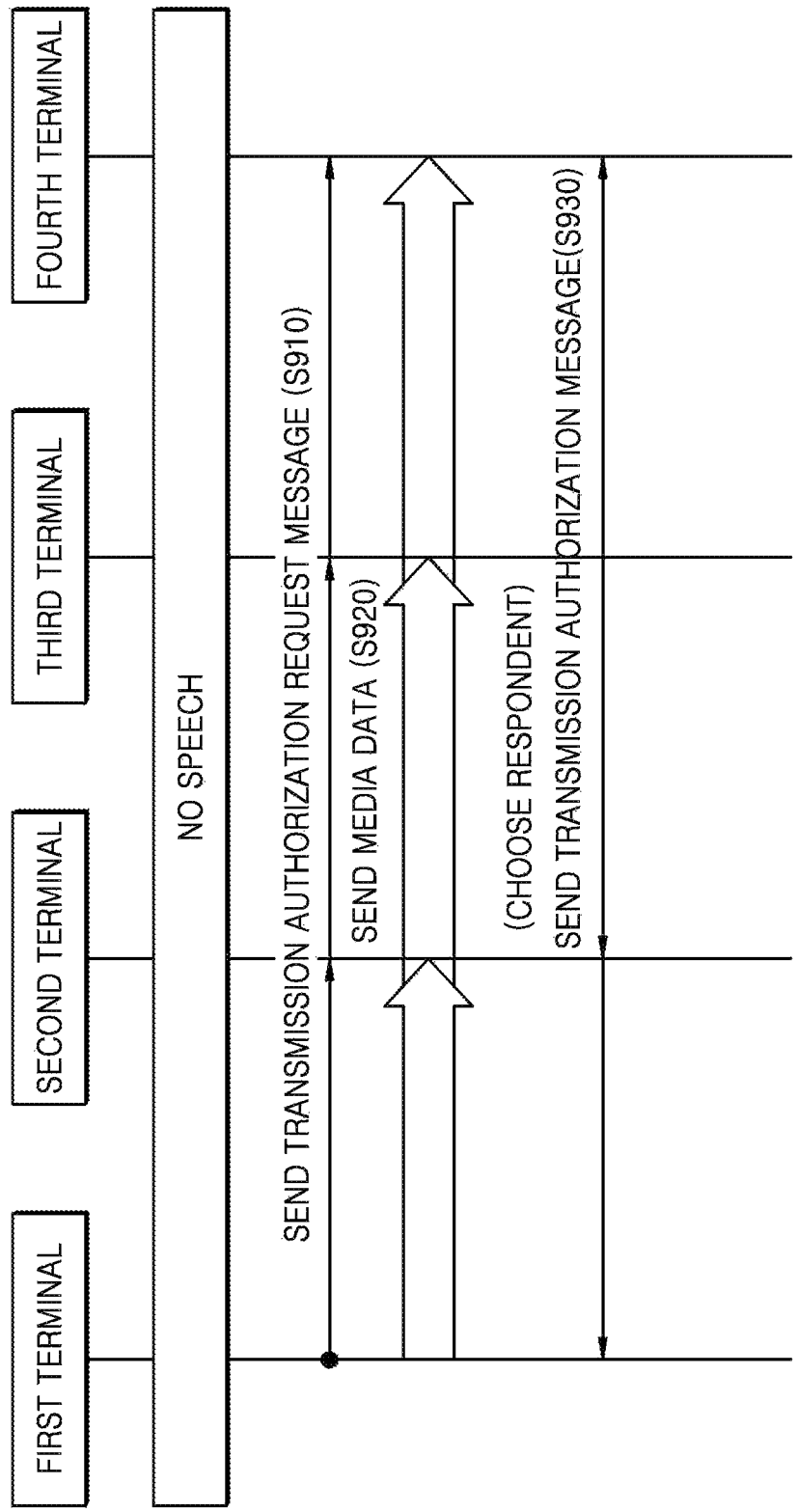
FIG. 9 is a flowchart illustrating a method of determining a terminal having the floor among terminals in a group in a communications system according to another embodiment.

FIG. 9 illustrates a method of determining a terminal having the floor among the terminals 110-140 in the group in a communications system 100 according to another embodiment.

In operation S910, the first terminal 110 may send the floor request to each of the other terminals 120-140 in the group if data is not received from the other terminals for a prescribed time.

In operation S920, the first terminal 110 may send the media data to each of the other terminals 120-140 in the group.

According to an embodiment, the first terminal 110 may send the media data after sending the floor request message without waiting for a receipt of the floor grant message from at least one of the other terminals 120-140 in the group.

In operation S930, the third terminal 130 may send the floor grant message for the first terminal 110 to the first terminal 110, the second terminal 120, and the fourth terminal 140. Here, the third terminal 130, whose stand-by time determined by the random value expires first, may be chosen as a respondent since the floor grant message is not received from the second terminal 120 or the fourth terminal 140 during the stand-by time. The third terminal 130 may send the floor grant message for the first terminal 110 to the first terminal 110, the second terminal 120, and the fourth terminal 140.

The first terminal 110 may continue to send the media data as the floor grant message is received from the third terminal 130 in the certain time.

Figure 10:
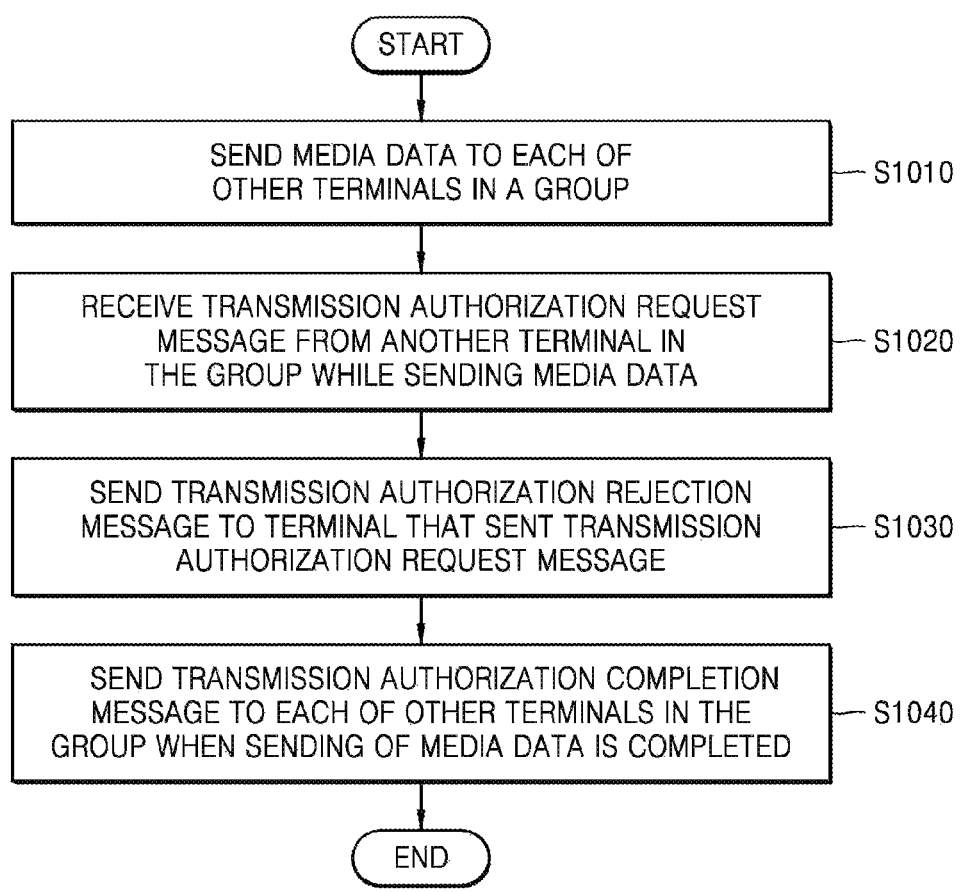
FIG. 10 is a flowchart illustrating a method of sending the media data in case that a first terminal receives a floor request message from another terminal in a group while sending the media data.

FIG. 10 illustrates a method of sending the media data in case that the first terminal 110 receives the floor request message from another terminal in the group while sending the media data.

In operation S1010, the first terminal 110 may send the media data to each of the other terminals 120-140 in the group. According to an embodiment, the first terminal 110 that obtained the floor may send the media data to each of the other terminals 120-140 in the group.

In operation S1020, the first terminal 110 may receive the floor request message from another terminal in the group while sending the media data. For example, the first terminal 110 may receive the floor request message from the second terminal 120 in the group while sending the media data.

In operation S1030, the first terminal 110 may send a floor denial message to the terminal (e.g. the second terminal 120) that sent the floor request message.

According to an embodiment, in case that the first terminal 110 receives the floor request message from another terminal in the group before the transmission of the media data is completed, the first terminal 110 may send the floor denial message to the terminal that sent the floor request message. For example, if the first terminal 110 receives the floor request message from the second terminal 120 while sending the media data, the first terminal 110 may send the floor denial message to the second terminal 120. Here, the first terminal 110 having the floor may perform a role of a temporary floor arbitrator.

In operation S1040, the first terminal 110 may send the floor release message to each of the other terminals 120-140 in the group when the transmission of the media data is completed.

Meanwhile, the terminals 110-140 in the group may not store queue information for the floor request message that is generated while the first terminal 110 is sending the media data. In such a case, the other terminal (e.g. the second terminal 120) that requested the floor while the first terminal 110 is sending the media data may send the floor request message again, after the first terminal 110 completes sending of the media data, to obtain the floor.

Figure 11:
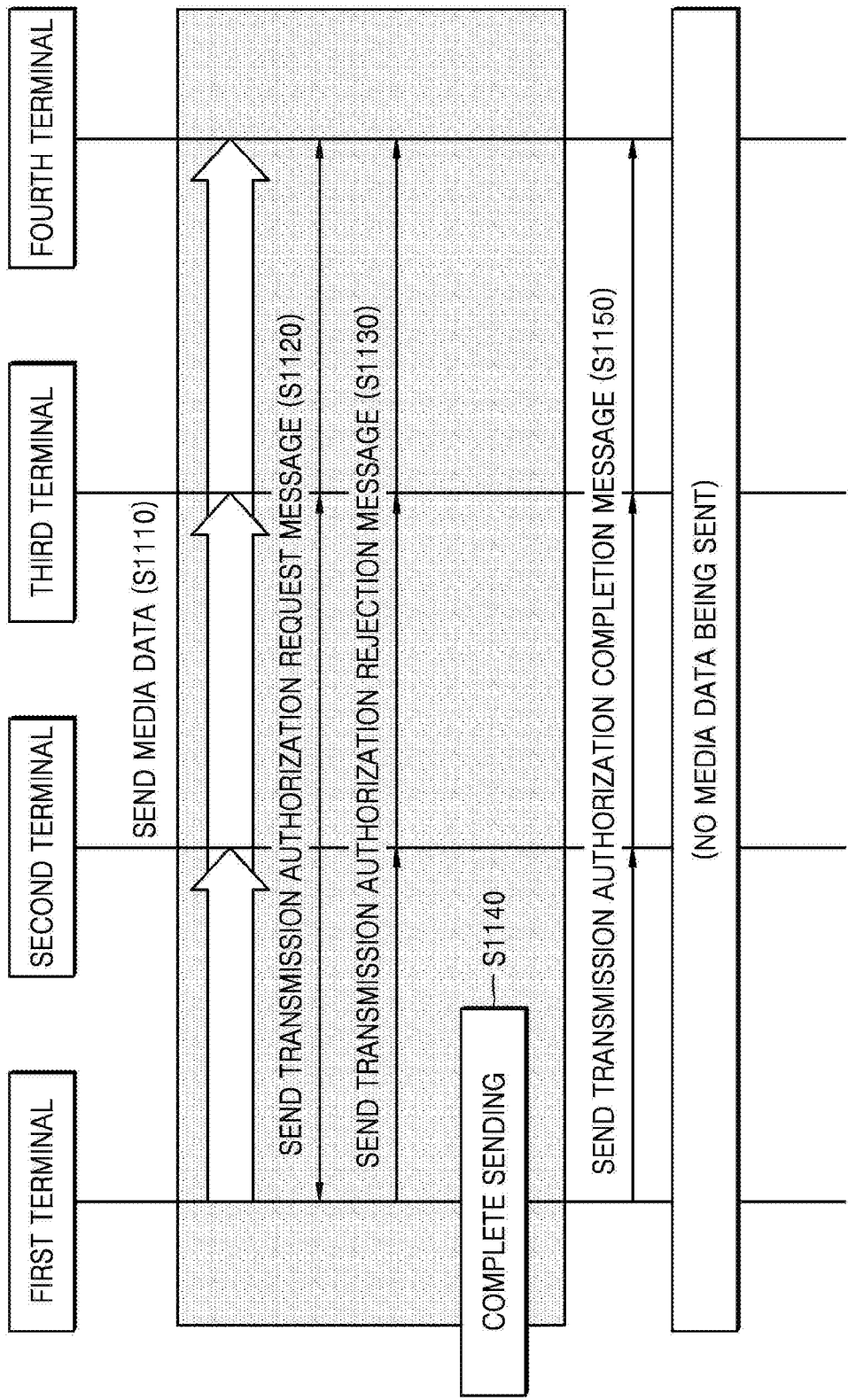
FIG. 11 is a flowchart illustrating a method of sending the media data in case that a floor request message is generated by another terminal in a group while a first terminal is sending the media data.

FIG. 11 illustrates a method of sending the media data in case that the floor request message is generated by another terminal in the group while the first terminal 110 is sending the media data in the communications system 100 according to an embodiment;

In operation S1110, the first terminal 110 may send the media data to each of the other terminals 120-140 in the group. According to an embodiment, the first terminal 110 that obtained the floor may send the media data to each of the other terminals 120-140 in the group.

In operation S1120, the second terminal 120 may send the floor request message to each of the first terminal 110, the third terminal 130, and the fourth terminal 140 while the first terminal 110 is sending the media data.

In operation S1130, the first terminal 110 may send the floor denial message for the second terminal 120 to each of the other terminals 120-140 in the group.

In operation S1140, the first terminal 110 may complete sending of the media data.

In operation S1150, the first terminal 110 may send the floor release message to each of the other terminals 120-140 in the group.

Meanwhile, the first terminal 110 may not store queue information for the floor request message of the second terminal 120 that is received while the first terminal 110 is sending the media data. Accordingly, there may be no terminal that sends the media data after the first terminal 110 completes sending of the media data. A terminal that needs the floor may obtain the floor by sending the floor request message to the other terminals.

Figure 12:
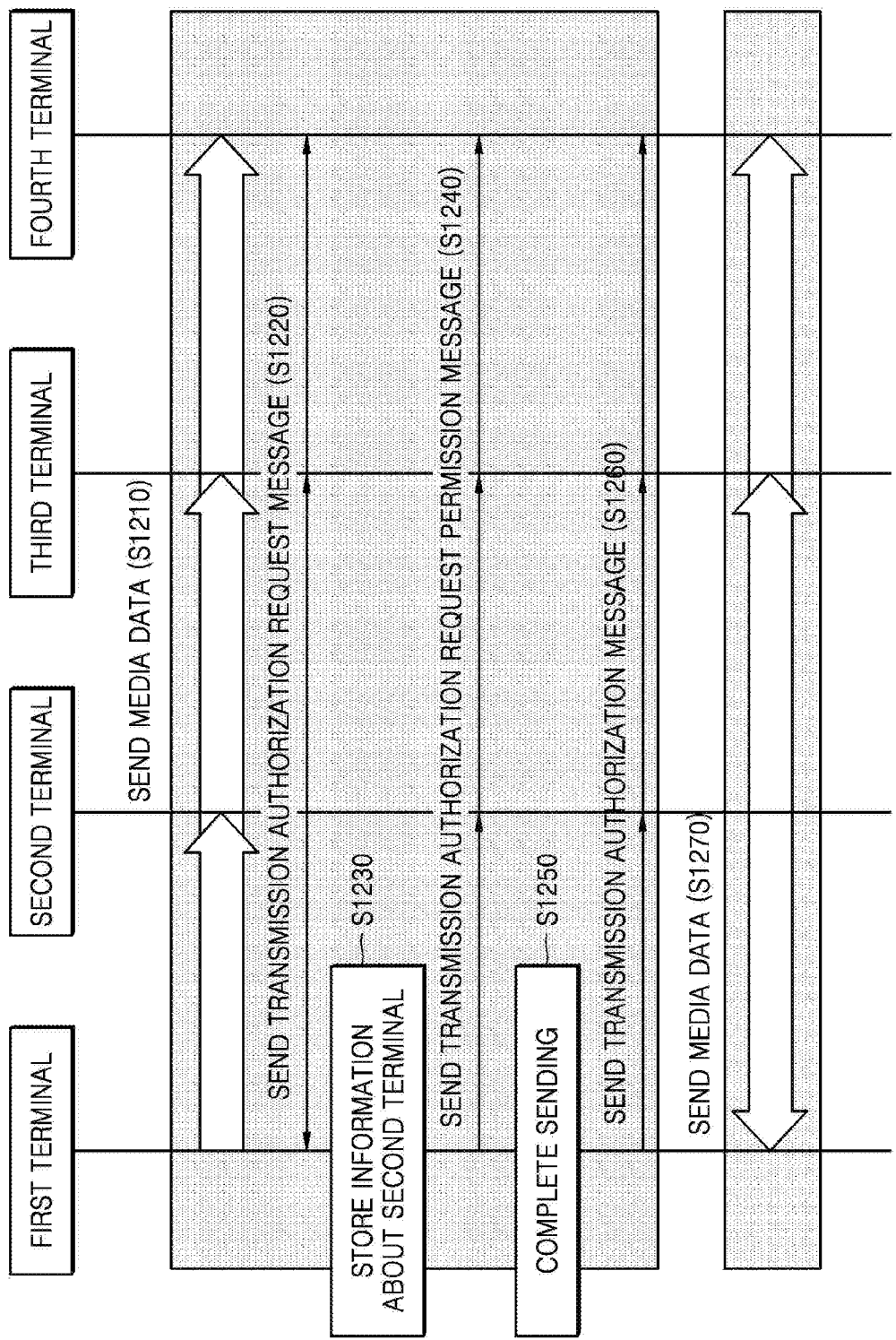
FIG. 12 is a flowchart illustrating a method of sending the media data in case that terminals store queue information in a communications system according to an embodiment.

FIG. 12 illustrates a method of sending the media data in case that the terminals store queue information in the communications system 100 according to an embodiment.

In operation S1210, the first terminal 110 may send the media data to other terminals 120-140 in the group.

In operation S1220, the second terminal 120 may send the floor request message to the first terminal 110, the third terminal 130, and the fourth terminal 140 while the first terminal 110 is sending the media data.

In operation S1230, the first terminal 110 may store information about the second terminal 120.

In the communications system 100 according to an embodiment, the first terminal 110 having the floor may operate as the temporary floor arbitrator and store the floor request message received from another terminal in the group.

For example, when the first terminal 110 receives the floor request message from the second terminal 120 while sending the media data, the first terminal 110 may store queue information for the floor request message of the second terminal 120. The queue information for the floor request message of the second terminal 120 may include at least one of: an identifier of the second terminal 120, a priority of the second terminal 120 in a queue, and a floor status of the second terminal 120.

In operation S1240, the first terminal 110 may send a floor request acceptance message for the second terminal 120 to each of the other terminals 120-140 in the group. Here, the floor request acceptance message is a message notifying that the floor request message of the second terminal 120 is received.

According to an embodiment, the floor request acceptance message may include at least one of: the identifier of the second terminal 120, the priority of the second terminal 120 in the queue, and received time of the floor request message of the second terminal 120. The second terminal 120 may check whether the floor request message of the second terminal 120 is received by the first terminal 110 having the floor by receiving the floor request acceptance message.

According to an embodiment, the second terminal 120 may monitor a receipt of the floor request acceptance message for a certain time while the second terminal 120 is receiving the media data from the first terminal 110 but the floor request acceptance message is not received. Here, the certain time may be one RTT, for example. The second terminal 120 may re-transmit the floor request message if the floor request message is not received for the certain time.

In operation S1250, the first terminal 110 may complete sending of the media data.

In operation S1260, the first terminal 110 may transmit the floor grant message to each of the other terminals 120-140 in the group.

According to an embodiment, after the first terminal 110 completes sending of the media data, the first terminal 110 may determine a terminal having the floor among the terminals waiting for the floor in the queue based on at least one of: the received time of the floor request message, the priority, and the random value of the terminals.

For example, the first terminal 110 may determine the second terminal 120 stored in the queue with a first waiting order as the terminal having the floor. The first terminal 110 may send the floor grant message for the second terminal 120 notifying that the second terminal 120 obtained the floor to each of the other terminals 120-140 in the group.

Here, the floor grant message may include information about the terminal waiting for the floor. For example, if the third terminal 130 is stored in the queue with a second waiting order in addition to the second terminal 120 having a first waiting order, the floor grant message for the second terminal 120 may include the identifier and the floor status of the third terminal 130. The third terminal 130 having the second waiting order may be updated to have the first waiting order after the second terminal 120 obtains the floor.

In operation S1270, the second terminal 120 may send the media data to the first terminal 110, the third terminal 130, and the fourth terminal 140.

On the other hand, if the second terminal 120 receives the floor request message from another terminal (e.g. the fourth terminal 140) while sending the media data, the second terminal 120 may store the queue information for the received floor request message. Also, according to another embodiment, if there is stored queue information that was detected from the floor grant message of the first terminal 110, the second terminal 120 may add the newly obtained queue information to the existing queue information.

Figure 13:
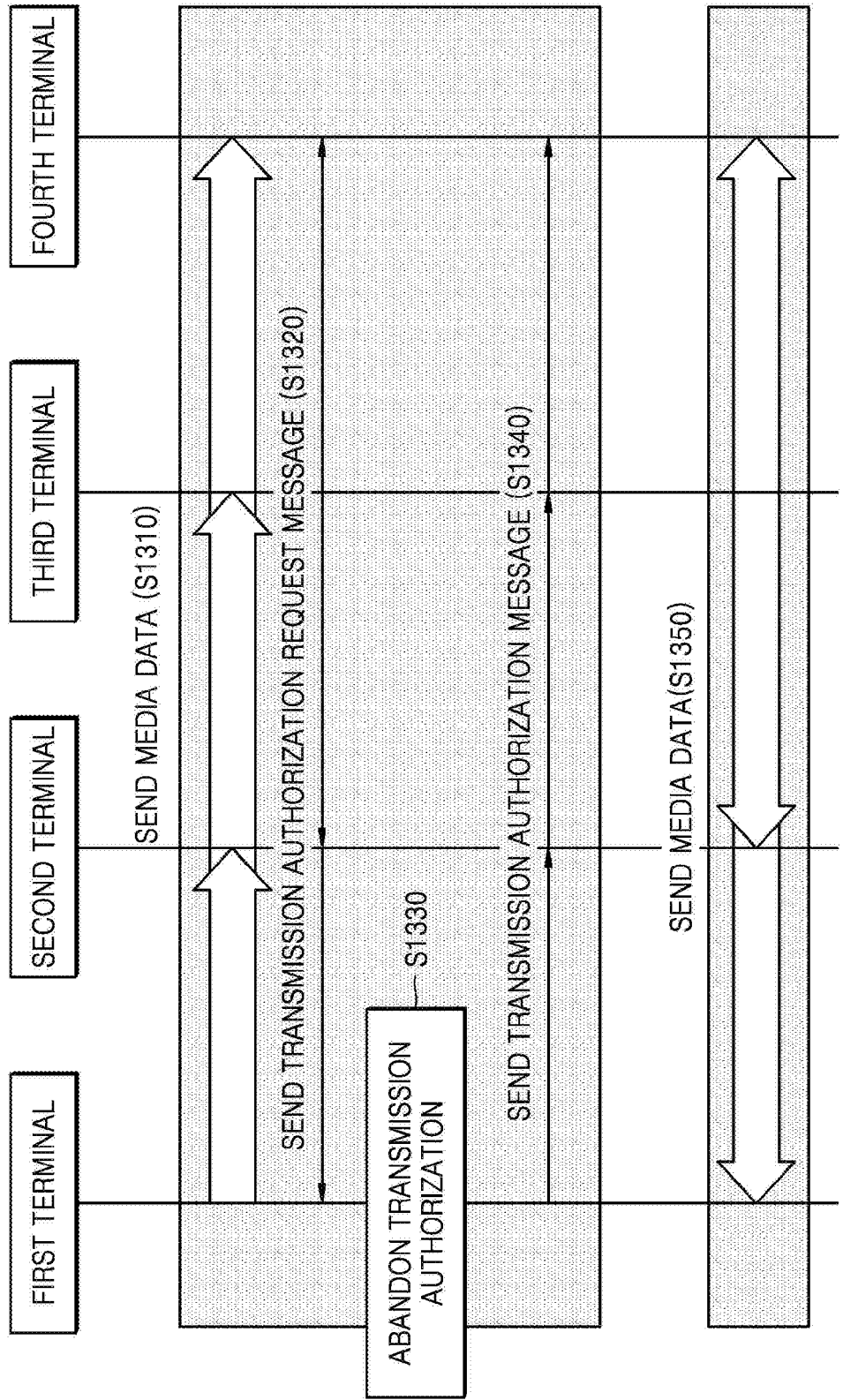
FIG. 13 is a flowchart illustrating a method of sending the media data in case that a first terminal receives the floor request message from a terminal having a higher priority while sending the media data.

FIG. 13 illustrates a method of sending the media data in case that the first terminal 110 receives the floor request message from a terminal having a higher priority while sending the media data.

In operation S1310, the first terminal 110 may send the media data to the other terminals 120-140 in the group.

In operation S1320, the third terminal 130 that has a higher priority than the first terminal 110 may send the floor request message to each of the first terminal 110, the second terminal 120, and the fourth terminal 140 while the first terminal 110 is sending the media data.

In operation S1330, the first terminal 110 that received, while sending the media data, the floor request message from the third terminal 130 that has a higher priority and may preempt the floor may revoke the floor. The information about the priority of the third terminal 130 may be included in the floor request message of the third terminal 130.

In operation S1340, the first terminal 110 may send the floor grant message for the third terminal 130 to each of the other terminals 120-140.

In operation S1350, the third terminal 130 may send the media data to each of the first terminal 110, the second terminal 120, and the fourth terminal 140 after receiving the floor grant message.

Figure 14:
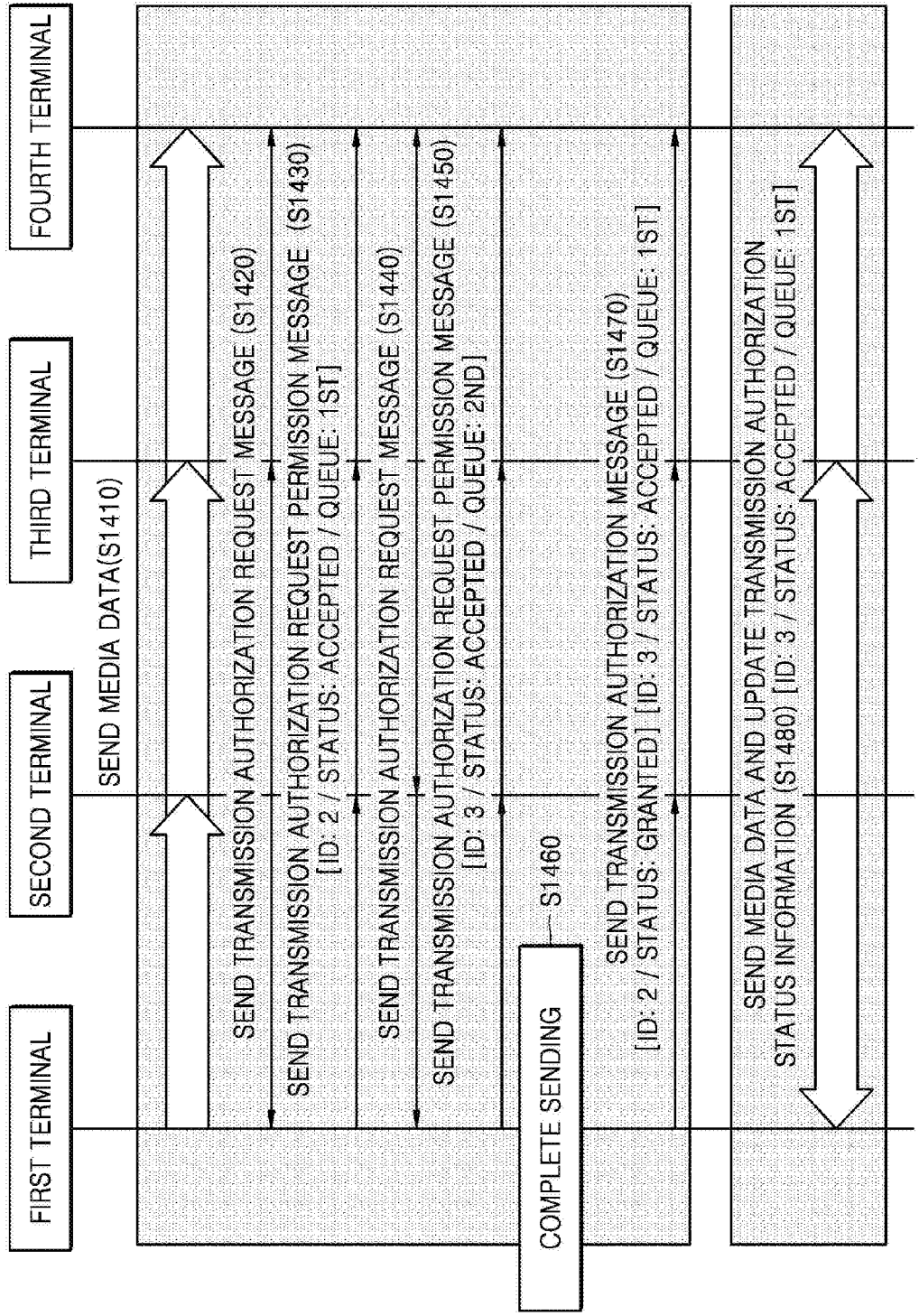
FIG. 14 is a flowchart illustrating a method of arbitrating floor requests by using a media burst control protocol (MBCP) in a communications system according to an embodiment.

FIG. 14 illustrates a method of arbitrating floor requests by using a media burst control protocol (MBCP) in the communications system 100 according to an embodiment.

In operation S1410, the first terminal 110 may send the media data to the other terminals 120-140 in the group.

In operation S1420, the second terminal 120 may send the floor request message to the first terminal 110, the third terminal 130, and the fourth terminal 140 while receiving the media data from the first terminal 110.

In operation S1430, the first terminal 110 may send the floor request acceptance message for the second terminal 120 to each of the other terminals 120, 130, and 140 in the group.

In the communications system 100 according to an embodiment, the first terminal 110 having the floor may operate as the temporary floor arbitrator and store the floor request message received from another terminal (e.g. the second terminal 120).

For example, the first terminal 110 may store the queue information for the floor request message of the second terminal 120. The queue information for the floor request message of the second terminal 120 may include at least one of: the identifier of the second terminal 120, the priority of the second terminal 120 in the queue, and the floor status of the second terminal 120.

The first terminal 110 may send the floor request acceptance message for the second terminal 120 to each of the other terminals 120-140 in the group. Here, the floor request acceptance message is a message notifying that the floor request message of the second terminal 120 is received.

The floor request acceptance message according to an embodiment may include at least one of: the identifier of the second terminal 120, the priority of the second terminal 120 in the queue, and received time of the floor request message of the second terminal 120. The second terminal 120 may check whether the floor request message of the second terminal 120 is received by the first terminal 110 having the floor by receiving the floor request acceptance message.

According to an embodiment, the second terminal 120 may monitor a receipt of the floor request acceptance message for a certain time while the second terminal 120 is receiving the media data from the first terminal 110 but the floor request acceptance message is not received. The second terminal 120 may re-transmit the floor request message if the floor request message is not received for the certain time.

In operation S1440, the third terminal 130 may send the floor request message to the first terminal 110, the second terminal 120, and the fourth terminal 140 while receiving the media data from the first terminal 110.

In operation S1450, the first terminal 110 may send the floor request acceptance message for the third terminal 130 to each of the other terminals 120, 130, and 140 in the group.

The first terminal 110 may store the queue information for the floor request message of the third terminal 130. The queue information for the floor request message of the third terminal 130 may include at least one of: the identifier of the third terminal 130, the priority of the third terminal 130 in the queue, and the floor status of the third terminal 130.

The first terminal 110 may send the floor request acceptance message for the third terminal 130 to each of the other terminals 120-140 in the group. Here, the floor request acceptance message is a message notifying that the floor request message of the third terminal 130 is received.

The floor request acceptance message according to an embodiment may include at least one of: the identifier of the third terminal 130, the priority of the third terminal 130 in the queue, and received time of the floor request message of the third terminal 130. The third terminal 130 may check whether the floor request message of the third terminal 130 is received by the first terminal 110 having the floor by receiving the floor request acceptance message.

According to an embodiment, since floor request message of the second terminal 120 arrived earlier than the floor request message of the third terminal 130, the first terminal 110 may determine a waiting order of the second terminal 120 to be a first order and the waiting order of the third terminal 130 to be a second order. However, such a determination is no more than an example, and the waiting order of the second terminal 120 and the third terminal 130 may be determined based on at least one of the priorities and random values of the terminals.

Meanwhile, the second terminal 120 may monitor a receipt of the floor request acceptance message for a certain time while the second terminal 120 is receiving the media data from the first terminal 110 but the floor request acceptance message is not received. The second terminal 120 may re-transmit the floor request message if the floor request message is not received for the certain time.

In operation S1460, the first terminal 110 may complete sending of the media data.

In operation S1470, the first terminal 110 may send the floor grant message for the second terminal 120 having the first waiting order.

According to an embodiment, after the first terminal 110 completes sending of the media data, the first terminal 110 may determine a terminal having the floor among the terminals waiting for the floor in the queue based on at least one of: the received time of the floor request message, the priority, and the random value of the terminals.

For example, the first terminal 110 may determine the second terminal 120 stored in the queue with a first waiting order as the terminal having the floor. The floor grant message for the second terminal 120 may include the identifier and the floor status of the second terminal 120 to notify the floor for the second terminal 120. Also, the floor grant message for the second terminal 120 may include information about the third terminal 130 waiting for the floor. As the second terminal 120 obtains the floor, the third terminal 130 having the second waiting order may be updated to have the first waiting order.

In operation S1480, as the second terminal 120 receives the floor grant message from the first terminal 110, the second terminal 120 may send the media data to the first terminal 110, the third terminal 130, and the fourth terminal 140.

Also, the second terminal 120 may store the floor status information of the third terminal 130 included in the floor grant message from the first terminal 110. The second terminal 120 may manage the floor status information of the third terminal 130 until the sending of the media data is completed.

Figure 15:
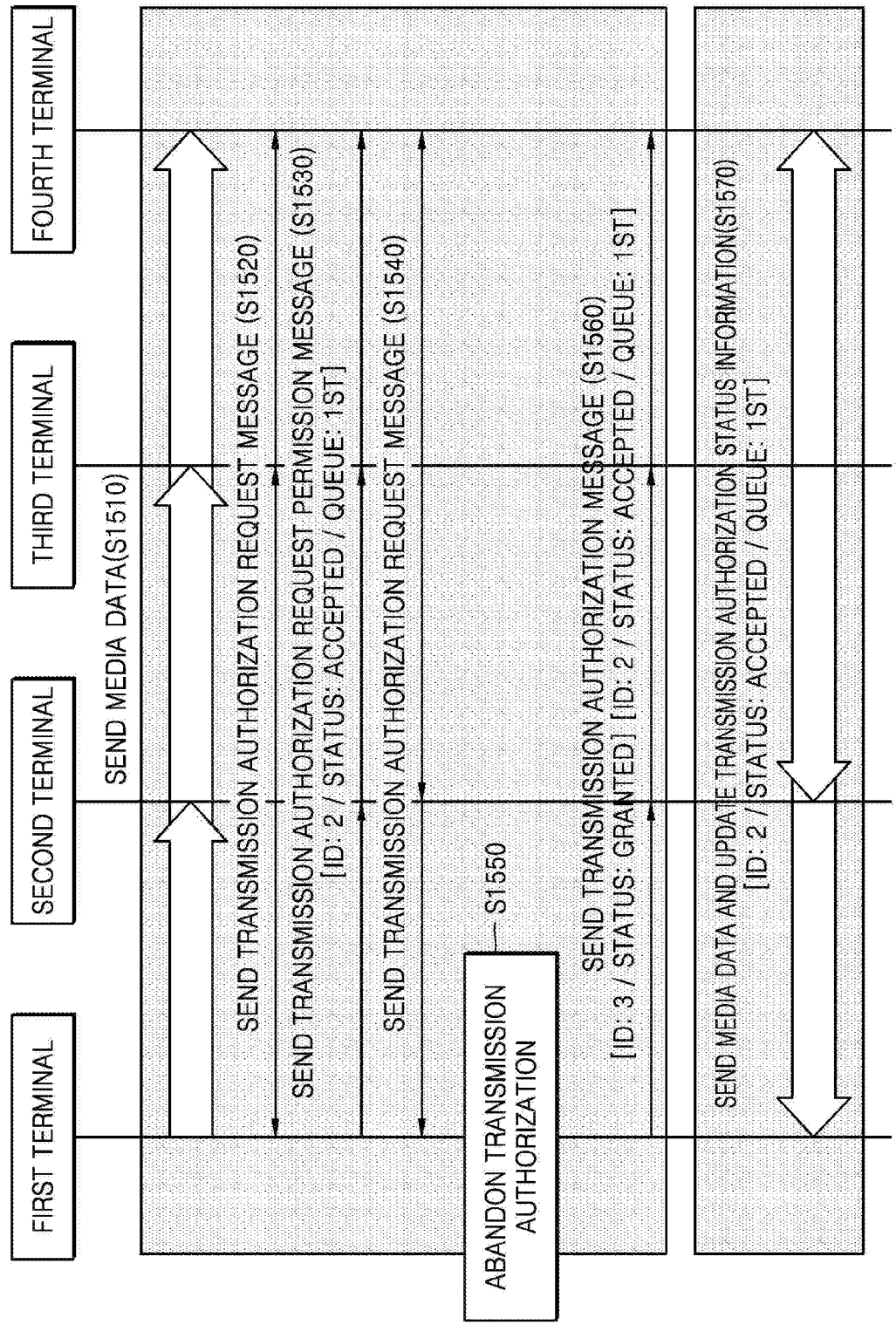
FIG. 15 is a flowchart illustrating a method of arbitrating floor requests by using the MBCP in case that a floor request message is generated by a terminal having a higher priority while a first terminal is sending the media data in a communications system according to an embodiment.

FIG. 15 illustrates a method of arbitrating floor requests by using the MBCP in case that the floor request message is generated by a terminal having a higher priority while the first terminal 110 is sending the media data in the communications system 100 according to an embodiment.

In operation S1510, the first terminal 110 may send the media data to the other terminals 120-140 in the group.

In operation S1520, the second terminal 120 may send the floor request message to the first terminal 110, the third terminal 130, and the fourth terminal 140 while receiving the media data from the first terminal 110.

In operation S1530, the first terminal 110 may send the floor request acceptance message for the second terminal 120 to each of the other terminals 120, 130, and 140 in the group. Meanwhile, the operation S1530 may correspond to the operation S1430 described above with reference to FIG. 14.

In operation S1540, the third terminal 130 may send the floor request message to the first terminal 110, the second terminal 120, and the fourth terminal 140 while receiving the media data from the first terminal 110.

In operation S1550, the first terminal 110 that received, while sending the media data, the floor request message from the third terminal 130 that has a higher priority and may preempt the floor may revoke or abandon the floor. The information about the priority of the third terminal 130 may be included in the floor request message of the third terminal 130.

In operation S1560, the first terminal 110 may send the floor grant message for the third terminal 130 to the other terminals 120-140 in the group.

According to an embodiment, upon completion of sending of the media data, the first terminal 110 may determine a terminal having the floor among the terminals waiting for the floor in the queue based on at least one of: the received time of the floor request message, the priority, and the random value of the terminals.

In this case, however, since the first terminal 110 revokes the floor due to the floor request message from the third terminal 130 having the higher priority, the first terminal 110 may determine the third terminal 130 as the terminal having the floor. The floor grant message for the third terminal 130 may include the identifier and the floor status of the third terminal 130 to notify the floor for the third terminal 130. Also, the floor grant message for the third terminal 130 may include information about the second terminal 120 waiting for the floor. As the third terminal 130 obtains the floor, the waiting orders of the other terminals may be updated.

In operation S1570, as the third terminal 130 receives the floor grant message from the first terminal 110, the third terminal 130 may send the media data to the first terminal 110, the second terminal 120, and the fourth terminal 140.

Also, the third terminal 130 may store the floor status information of the second terminal 120 included in the floor grant message from the second terminal 120. The third terminal 130 may manage the floor status information of the second terminal 120 until the sending of the media data is completed.

Figure 16:
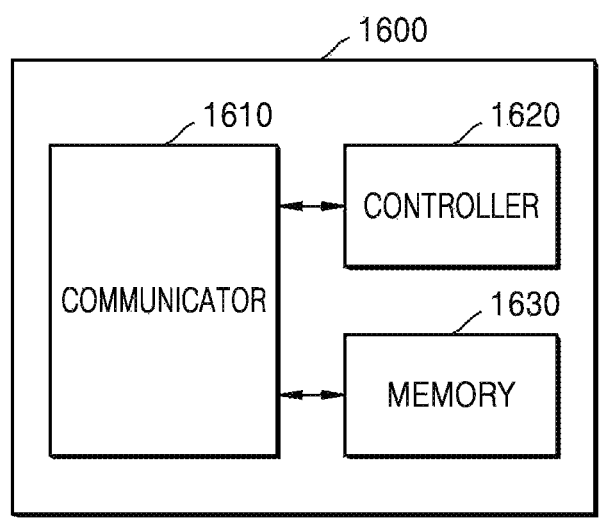
FIG. 16 is a block diagram of a first terminal according to an embodiment.

FIG. 16 is a block diagram of the first terminal 1600 according to an embodiment.

The first terminal 1600 shown in the drawing may includes a communicator 1610, a controller 1620, and a memory 1630. Even though only the components related with the present embodiment are shown in FIG. 16, those having ordinary skills in the art would appreciate that other general purpose components may be further included in FIG. 16 in addition to the illustrated components.

The communicator 1610 transmits the floor request message to each of the other terminals in the group in which the terminal 1600 is included. The communicator 1610 receives the floor grant message from at least one of the other terminals in the group in which the first terminal is included after the expiration of stand-by times that may be randomly determined in each of the other terminals 120-140 in the group.

According to an embodiment, the communicator 1610 may receive the floor request message from another terminal in the group during a prescribed time after receiving the floor request message.

Also, the communicator 1610 may receive the floor request message from another terminal in the group while sending the media data, and send the floor release message to each of the other terminals in the group upon completion of sending the media data.

According to an embodiment, the communicator 1610 may send the floor grant message to another terminal and receive the media data from the other terminal.

According to another embodiment, the communicator 1610 may send the floor request message to each of the other terminals in the group in which the first terminal is included, and send the media data to each of the other terminals in the group before the floor grant message is received.

The controller 1620 implements the functions, processes, and/or methods described in this disclosure. The operations of the first terminal 1600 discussed above may be implemented by the controller 1620.

The controller 1620 determines whether the floor grant message is received from at least one of the other terminals in the group or not.

According to an embodiment, the controller 1620 may stop sending the media data in case that the first terminal 1600 receives the floor request message from another terminal in the group while sending the media data and the priority of the other device is higher than the first terminal.

According to another embodiment, in case that the first terminal sends the floor request message and begin sending of the media data to each of the other terminals in the group before receiving the floor grant message, the controller 1620 may determine whether the floor grant message is received from at least one of the other terminals in the group in a certain time interval set previously or not. The controller 1620 may stop sending the media data if the floor grant message is not received during the time interval.

The memory 1630, coupled with the controller 1620, stores protocols or parameters needed for the operation of the first terminal. For example, the memory 1630 may store at least one of the queue information of the terminals which requested the floor and the floor status information.

Figure 17:
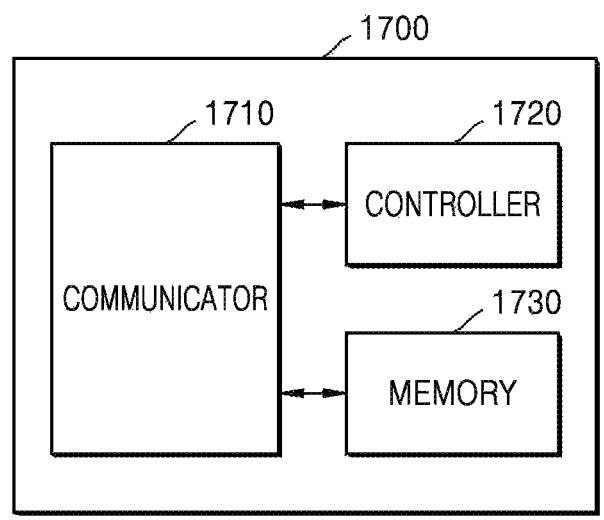
FIG. 17 is a block diagram of a terminal other than the first terminal according to an embodiment.

FIG. 17 is a block diagram of a terminal 1700 other than the first terminal according to an embodiment.

The terminal 1700 shown in the drawing may includes a communicator 1710, a controller 1720, and a memory 1730. Even though only the components related with the present embodiment are shown in FIG. 17, those having ordinary skills in the art would appreciate that other general purpose components may be further included in FIG. 17 in addition to the illustrated components.

The communicator 1710 receives the floor request message from the first terminal 1600 among the other terminals in the group in which the terminal 1700 is included. The communicator 1710 transmits the floor grant message for the first terminal 1600 to each of the other terminals in the group based on a determination result of the controller 1720 and receives the media data from the first terminal 1600.

According to an embodiment, the communicator 1710 may send the floor grant message to the first terminal 1600 in case that the floor grant message for the first terminal 1600 is not received from any of the terminals in the group.

Also, the communicator 1710 may send the floor grant message to the first terminal 1600 having a higher priority than a second terminal. According to another example, the communicator 1710 may send the floor grant message to the first terminal 1600 having a greater random value than the second terminal 1700.

The controller 1720 implements the functions, processes, and/or methods described in this disclosure. The operations of the terminal 1700 discussed above may be implemented by the controller 1720.

The controller 1720 determines whether the floor grant message is received from another terminal in the group or not.

According to an embodiment, the controller 1720 may monitor whether the floor request message is received from another terminal in the group during a certain time interval set previously from the instant that the floor request message is received from the first terminal 1600. If the floor request message is not received from any of the other terminals in the group, the controller 1720 may determine the first terminal 1600 as the terminal having the floor.

In case that the floor request message is received from the second terminal among the other terminals in the group, the controller 1720 may compare the priority of the first terminal with that of the second terminal to determine the terminal having the floor.

Also, when the floor request message is received from the second terminal among the other terminals in the group, the controller 1720 may compare the random number generated in the first terminal with the random number generated in the second terminal to determine the terminal having the floor.

The memory 1730, coupled with the controller 1720, stores protocols or parameters needed for the operation of the first terminal. For example, the memory 1730 may store at least one of the queue information of the terminals which requested the floor and the floor status information.

The apparatuses described herein may be implemented using hardware components. The hardware components may include, for example, processors, memories for storing program data, permanent or temporary storages, communication ports, and user interface devices such as touch panels, keys, and buttons. The processes and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, and optical recording media (e.g., CD-ROMs, or DVDs). In addition, functional programs, codes, and code segments for accomplishing the example disclosed herein can be construed by programmers skilled in the art based on the flow diagrams and block diagrams of the figures and their corresponding descriptions as provided herein.

All the documents cited in the present disclosure including publications, patent applications, and patents may be incorporated with the disclosed embodiments in the same manner as being described separately and concretely or being discussed in the present disclosure.

Though reference numerals are used in the drawings and particular terms are used in the description of the embodiments to aid the understanding of the embodiments, the present disclosure is not limited by the reference numerals and the particular terms. It is noted that the disclosed embodiments may further include additional components that may be routinely contemplated by those having ordinary skills in the art.

The disclosed embodiments may be described in terms of functional blocks and various operations. The functional blocks may be implemented using hardware and/or software components. For example, the exemplary embodiments may employ tangible circuits including a processor and a memory. The exemplary embodiments may include various algorithms implemented by combinations of data structure, process, routines, and program components, and may be written in programming languages such as C, C++, Java, and assembler, or scripting languages. Functional aspects or operations may be implemented by algorithms that may be executed in one or more processors. Also, the exemplary embodiments may employ general-purpose technologies for electronic environment settings, signal processing, and/or data processing. Terminologies such as "unit," "element," and "means" are used in broad sense, and are not intended to limit mechanical or physical configuration.

Specific executions described above regarding the embodiments are presented for exemplary purposes and not intended to limit the scope of the disclosure. For simplicity, descriptions of general-purpose circuits, control systems, software, and other functional aspects are omitted. Connections or interconnections between components in the drawings represent schematically and exemplarily functional connections and/or physical or circuit connections, and may be replaced by or incorporated with additional functional connections and/or physical or circuit connections. Unless there is a specific description using limitations such as "essentially" and "importantly." such connections should not be regarded to be essential in the implementation of the embodiments.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A communication method in a terminal, comprising:
sending a floor request message, by a first terminal, to each of other terminals in a group in which the first terminal is included;
receiving a floor grant message from at least of the other terminals in the group after expiration of at least one of stand-by times determined randomly for each of the other terminals; and
sending media data to each of the other terminals in the group.

2. The method of claim 1, further comprising:
receiving a floor request message of another terminal in the group in a preset time interval after the floor request message is sent,
wherein, in the operation of the receiving the floor grant message, the floor grant message is received if a priority of the first terminal is higher than a priority of the other terminal.

3. The method of claim 1, further comprising:
receiving a floor request message of another terminal in the group in a preset time interval after the floor request message is sent,
wherein, in the operation of the receiving the floor grant message, the floor grant message is received if a random number generated in the first terminal is greater than a random number generated in the other terminal.

4. The method of claim 1, further comprising:
receiving a floor request message of another terminal in the group while sending the media data;
sending a floor denial message to the other terminal; and
sending a floor release message to each of the other terminals after the sending of the media data is completed.

5. The method of claim 1, further comprising:
receiving a floor request message of another terminal in the group while sending the media data;
stopping the sending of the media data if a priority of the other terminal is higher than a priority of the first terminal;
sending a floor grant message to the other terminal; and
receiving media data of the other terminal.

6. A first terminal, comprising:
a communicator configured to send or receive messages;
a controller configured to control to send a floor request message to each of other terminals in a group in which the first terminal is included, receive a floor grant message from at least of the other terminals in the group after expiration of at least one of stand-by times determined randomly for each of the other terminals, and send media data to each of the other terminals in the group.

7. The first terminal of claim 6, wherein the communicator is configured to receives a floor request message of another terminal in the group in a preset time interval after the floor request message is sent,
wherein the floor grant message is received when a priority of the first terminal is higher than a priority of the other terminal.

8. The first terminal claim 6, wherein the communicator is configured to receive a floor request message of another terminal in the group in a preset time interval after the floor request message is sent,
wherein the floor grant message is received when a random number generated in the first terminal is greater than a random number generated in the other terminal.

9. The first terminal of claim 6, wherein the communicator is capable of receiving a floor request message of another terminal in the group while sending the media data, and is configured to send a floor release message to each of the other terminals after the sending of the media data is completed.

10. The first terminal of claim 6, wherein the controller is configured to stop sending of the media data if a floor request message of another terminal in the group is received while sending the media data and a priority of the other terminal is higher than a priority of the first terminal,
    wherein the communicator is configured to send a floor grant message to the other terminal and receive media data of the other terminal.

11. The method of claim 1, wherein the floor grant message is received from a second terminal among the other terminals, when a stand-by time of the second terminal is firstly expired among the stand-by times of the other terminals.

12. The first terminal of claim 6, wherein the floor grant message is received from a second terminal among the other terminals, when a stand-by time of the second terminal is firstly expired among the stand-by times of the other terminals.

* * * * *